(12) United States Patent
zur Loye et al.

(10) Patent No.: US 12,510,033 B2
(45) Date of Patent: Dec. 30, 2025

(54) SYSTEM AND METHOD FOR CONTROLLING FUEL SUBSTITUTION IN A DUAL FUEL ENGINE SYSTEM

(71) Applicant: Cummins Power Generation Inc., Minneapolis, MN (US)

(72) Inventors: Axel O. zur Loye, Columbus, IN (US); Travis Alva Anderson, Columbus, IN (US); Matthew W. Isaacs, Moncks Corner, SC (US); Jason A Gore, Highland Village, TX (US); Malhon T. Godwin, Minneapolis, MN (US)

(73) Assignee: Cummins Power Generation Inc., Minneapolis, MN (US)

( * ) Notice: Subject to any disclaimer, the term of this patent is extended or adjusted under 35 U.S.C. 154(b) by 0 days.

(21) Appl. No.: 18/885,385

(22) Filed: Sep. 13, 2024

(65) Prior Publication Data

US 2025/0092836 A1 Mar. 20, 2025

Related U.S. Application Data

(60) Provisional application No. 63/538,784, filed on Sep. 15, 2023.

(51) Int. Cl.
*F02D 19/06* (2006.01)
*F02D 19/02* (2006.01)

(52) U.S. Cl.
CPC ....... *F02D 19/0615* (2013.01); *F02D 19/021* (2013.01); *F02D 19/023* (2013.01);
(Continued)

(58) Field of Classification Search
CPC .. F02D 19/0615; F02D 19/021; F02D 19/023; F02D 19/0607; F02D 19/0644; F02D 19/0647
See application file for complete search history.

(56) References Cited

U.S. PATENT DOCUMENTS 4,278,064 A 7/1981 Regueiro
5,937,800 A 8/1999 Brown et al.
(Continued)

FOREIGN PATENT DOCUMENTS

DE 10 2011 005 974 A1 9/2012
DE 10 2016 108 605 A1 11/2016
(Continued)

OTHER PUBLICATIONS

Extended European Search Report on EP Appl. Ser. No. 24199732.9 Dated Feb. 27, 2025 (9 pages).
(Continued)

*Primary Examiner* — Syed O Hasan
(74) *Attorney, Agent, or Firm* — Foley & Lardner LLP

(57) ABSTRACT

A method of controlling a dual fuel engine configured to receive a first fuel and a second fuel includes operating the engine using the first fuel, measuring a current load of the engine, sending a first signal to a first fuel system to deliver an amount of the first fuel to the engine, and determining at least one first operating parameter associated with the engine. The method also includes determining an engine load estimate based on the first signal and the at least one first operating parameter, comparing the engine load estimate to the measured load, and based on the comparison, determining, an adjusted engine load estimate to compensate for a drift in the first fuel system.

13 Claims, 15 Drawing Sheets

(52) U.S. Cl.
CPC ..... *F02D 19/0607* (2013.01); *F02D 19/0644* (2013.01); *F02D 19/0647* (2013.01)

(56) References Cited

U.S. PATENT DOCUMENTS

| | | | |
|---|---|---|---|
| 6,101,986 | A | 8/2000 | Brown et al. |
| 6,470,679 | B1 | 10/2002 | Ertle |
| 6,543,395 | B2 | 4/2003 | Green |
| 6,705,301 | B2 | 3/2004 | Dollmeyer et al. |
| 7,010,417 | B2 | 3/2006 | Edwards et al. |
| 7,707,821 | B1 | 5/2010 | Legare |
| 7,886,523 | B1 | 2/2011 | Legare |
| 7,913,673 | B2 | 3/2011 | Vanderslice et al. |
| 8,509,974 | B2 | 8/2013 | Sujan et al. |
| 8,813,690 | B2 | 8/2014 | Kumar et al. |
| 8,834,318 | B2 | 9/2014 | Sujan et al. |
| 8,863,497 | B1 | 10/2014 | Legare |
| 9,233,696 | B2 | 1/2016 | Kumar et al. |
| 9,248,736 | B2 | 2/2016 | Green |
| 9,254,849 | B1 | 2/2016 | Green |
| 9,266,542 | B2 | 2/2016 | Daum et al. |
| 9,278,614 | B2 | 3/2016 | Green |
| 9,371,789 | B2 | 6/2016 | Rosswurm et al. |
| 9,394,841 | B1 | 7/2016 | Green |
| 9,410,490 | B2 | 8/2016 | Kolhouse et al. |
| 9,421,861 | B2 | 8/2016 | Green |
| 9,428,047 | B2 | 8/2016 | Green |
| 9,527,518 | B2 | 12/2016 | Lacy et al. |
| 9,528,447 | B2 | 12/2016 | Green |
| 9,669,851 | B2 | 6/2017 | Cooper et al. |
| 9,682,716 | B2 | 6/2017 | Noffsinger et al. |
| 9,689,681 | B2 | 6/2017 | Napolitano et al. |
| 9,696,066 | B1 | 7/2017 | Green |
| 9,733,625 | B2 | 8/2017 | Kumar et al. |
| 9,738,154 | B2 | 8/2017 | Green |
| 9,834,237 | B2 | 12/2017 | Plotnikov et al. |
| 9,835,098 | B2 | 12/2017 | Rumbel et al. |
| 9,845,744 | B2 | 12/2017 | Green |
| 9,885,318 | B2 | 2/2018 | Green |
| 9,931,929 | B2 | 4/2018 | Green |
| 9,973,831 | B2 | 5/2018 | Mejegård et al. |
| 10,032,123 | B2 | 7/2018 | Mejegård et al. |
| 10,086,694 | B2 | 10/2018 | Green |
| 10,113,493 | B2 | 10/2018 | Atterberry et al. |
| 10,145,317 | B2 | 12/2018 | Zur Loye et al. |
| 10,208,686 | B1 * | 2/2019 | Thomas .............. F02D 41/2477 |
| 10,227,934 | B2 | 3/2019 | Thomas et al. |
| 10,308,265 | B2 | 6/2019 | Fahmy |
| 10,371,069 | B2 | 8/2019 | Bzymek et al. |
| 10,569,792 | B2 | 2/2020 | Fahmy et al. |
| 10,669,954 | B2 | 6/2020 | King et al. |
| 10,711,723 | B2 | 7/2020 | Thomas et al. |
| 10,808,670 | B2 | 10/2020 | Books et al. |
| 10,815,913 | B2 | 10/2020 | Bruner et al. |
| 10,920,687 | B2 | 2/2021 | Hsieh et al. |
| 10,935,449 | B2 | 3/2021 | Barta et al. |
| 11,125,139 | B2 | 9/2021 | Ernst et al. |
| 11,136,932 | B2 | 10/2021 | Zur Loye et al. |
| 2005/0121005 | A1 | 6/2005 | Edwards |
| 2012/0210988 | A1 | 8/2012 | Willi |
| 2013/0086893 | A1 | 4/2013 | Shinoda et al. |
| 2014/0074380 | A1 | 3/2014 | Fisher et al. |
| 2014/0188372 | A1 * | 7/2014 | Puckett ............... F02D 19/0615 701/104 |
| 2014/0352656 | A1 | 12/2014 | Kolhouse et al. |
| 2015/0300299 | A1 | 10/2015 | Licitar |
| 2015/0345408 | A1 | 12/2015 | Sivasubramanian et al. |
| 2015/0354308 | A1 | 12/2015 | June et al. |
| 2016/0208764 | A1 | 7/2016 | Mann et al. |
| 2016/0222891 | A1 | 8/2016 | Zeng et al. |
| 2017/0089273 | A1 | 3/2017 | Thomas et al. |
| 2017/0122246 | A1 | 5/2017 | Ottikkutti et al. |
| 2017/0226973 | A1 | 8/2017 | Blizard et al. |
| 2018/0142629 | A1 | 5/2018 | Stockner et al. |
| 2018/0347494 | A1 * | 12/2018 | Sanborn ................ F02D 41/221 |
| 2020/0271068 | A1 | 8/2020 | Dodis et al. |
| 2020/0318556 | A1 | 10/2020 | Chiu et al. |
| 2021/0017918 | A1 | 1/2021 | Bruner et al. |
| 2021/0087981 | A1 * | 3/2021 | Wang ................. F02D 41/0027 |
| 2021/0301700 | A1 | 9/2021 | Brahma |

FOREIGN PATENT DOCUMENTS

| | | |
|---|---|---|
| KR | 10-1938914 | 1/2019 |
| WO | WO-02/073016 | 9/2002 |
| WO | WO-03/076788 | 9/2003 |
| WO | WO-2007/120520 A2 | 10/2007 |
| WO | WO-2012/017972 | 2/2012 |
| WO | WO-2012/135258 A2 | 10/2012 |
| WO | WO-2013/082004 A1 | 6/2013 |
| WO | WO-2014/154227 A1 | 10/2014 |
| WO | WO-2015/149227 | 10/2015 |
| WO | WO-2020/200486 | 10/2020 |

OTHER PUBLICATIONS

Debnath et al., "Effect of hydrogen-diesel quantity variation on brake thermal efficiency of a dual fuelled diesel engine", Journal of Power Technologies, 2012, vol. 92 (1), pp. 55-67.

International Search Report and Written Opinion for International Application No. PCT/US2023/032652, dated Jan. 19, 2024, 16 pgs.

International Search Report and Written Opinion for International Application No. PCT/US2023032654, dated Feb. 26, 2024, 32 pgs.

Non-Final Office Action for U.S. Appl. No. 17/944,900, dated Mar. 11, 2024, 6 pgs.

Non-Final Office Action on U.S. Appl. No. 17/944,910 DTD May 10, 2023.

Non-Final Office Action on U.S. Appl. No. 18/402,342 DTD Jun. 13, 2024.

Notice of Allowance for U.S. Appl. No. 17/944,905, dated Mar. 21, 2024, 8 pgs.

Notice of Allowance on U.S. Appl. No. 17/944,900 DTD Aug. 13, 2024.

Notice of Allowance on U.S. Appl. No. 17/944,910 DTD Sep. 13, 2023.

* cited by examiner

SYSTEM AND METHOD FOR CONTROLLING FUEL SUBSTITUTION IN A DUAL FUEL ENGINE SYSTEM

CROSS-REFERENCE TO RELATED APPLICATIONS

This application claims priority to U.S. Provisional Application No. 63/538,784, filed Sep. 15, 2023, which is hereby incorporated herein by reference in its entirety.

BACKGROUND

The present disclosure relates generally to methods for controlling a dual fuel engine system.

Generally, a dual fuel engine system can include an original equipment manufacturer (OEM) machine control system, a base engine control system or module (ECM) operatively coupled to the OEM, and a gas control system operatively coupled to both the OEM machine control system and the base engine control system.

SUMMARY

One aspect of the disclosure relates to a method of controlling a dual fuel engine configured to receive a first fuel and a second fuel. The method includes operating the engine using the first fuel, measuring, by a controller, a current load of the engine, and sending, by the controller, a first signal to a first fuel system to deliver an amount of the first fuel to the engine. The method also includes determining, by the controller, at least one first operating parameter associated with the engine, determining, by the controller, an engine load estimate based on the first signal and the at least one first operating parameter, comparing, by the controller, the engine load estimate to the measured current load, and based on the comparison, determining, by the controller, an adjusted engine load estimate to compensate for a drift in the first fuel system.

In various embodiments, the method also includes determining, by the controller, an amount of a second fuel to deliver to the engine. In some embodiments, determining the amount of the second fuel to deliver to the engine is based on comparing the engine load estimate to the measured current load. In other embodiments, the method further includes operating, by the controller, the engine using the adjusted engine load estimate for one of a predetermined number of cycles or a predetermined period of time, where the amount of the second fuel is determined based on at least one second operating parameter determined during the predetermined number of cycles or the predetermined period of time. In yet other embodiments, the method also includes determining, by the controller, a parasitic load on the engine. In various embodiments, determining the parasitic load on the engine includes determining, by the controller, a load corresponding to at least one cooling fan. In some embodiments, determining the engine load estimate includes determining, by the controller, a net engine load. In other embodiments, determining the net engine load includes estimating, by the controller, a gross engine load, and subtracting the parasitic load.

Another aspect of the present disclosure relates to a dual fuel engine system. The dual fuel engine system includes an engine configured to receive a first fuel and a second fuel, a first fuel system for delivering the first fuel to the engine, a second fuel system for delivering the second fuel to the engine, and a controller operably coupled to each of the engine, the first fuel system, and the second fuel system. The controller is configured to transmit a first signal to one of the first fuel system or the second fuel system to cause the first fuel system or the second fuel system to deliver an amount of the respective first fuel or the second fuel, measure a current engine load, determine at least one first operating parameter of the engine, determine an engine load estimate based the at least one first operating parameter and the amount of the first fuel or the second fuel, compare the engine load estimate to the current engine load, and based on the comparison, determine an adjusted engine load estimate to compensate for drift in one of the first fuel or the second fuel.

In various embodiments, the controller is further configured to determine an amount of the other of the first fuel or the second fuel to deliver to the engine. In some embodiments, the controller is configured to determine the amount of the other of the first fuel or the second fuel based on at least one second operating parameter. In other embodiments, the current engine load is based on at least one of an engine torque or an engine speed. In yet other embodiments, the dual fuel engine system further includes a generator driven by the engine, wherein the current engine load is based on a current and voltage corresponding to a generator. In various embodiments, the at least one first operating parameter includes at least one of an engine speed, a coolant temperature, an oil temperature, a coolant pressure, an oil pressure, an intake manifold pressure, an intake manifold temperature, an exhaust manifold temperature, an exhaust manifold pressure, an injection timing, or an injection pressure. In some embodiments, the first signal includes at least one of: an electrical signal, a hydraulic parameter, or a mechanical adjustment.

This summary is illustrative only and should not be regarded as limiting.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
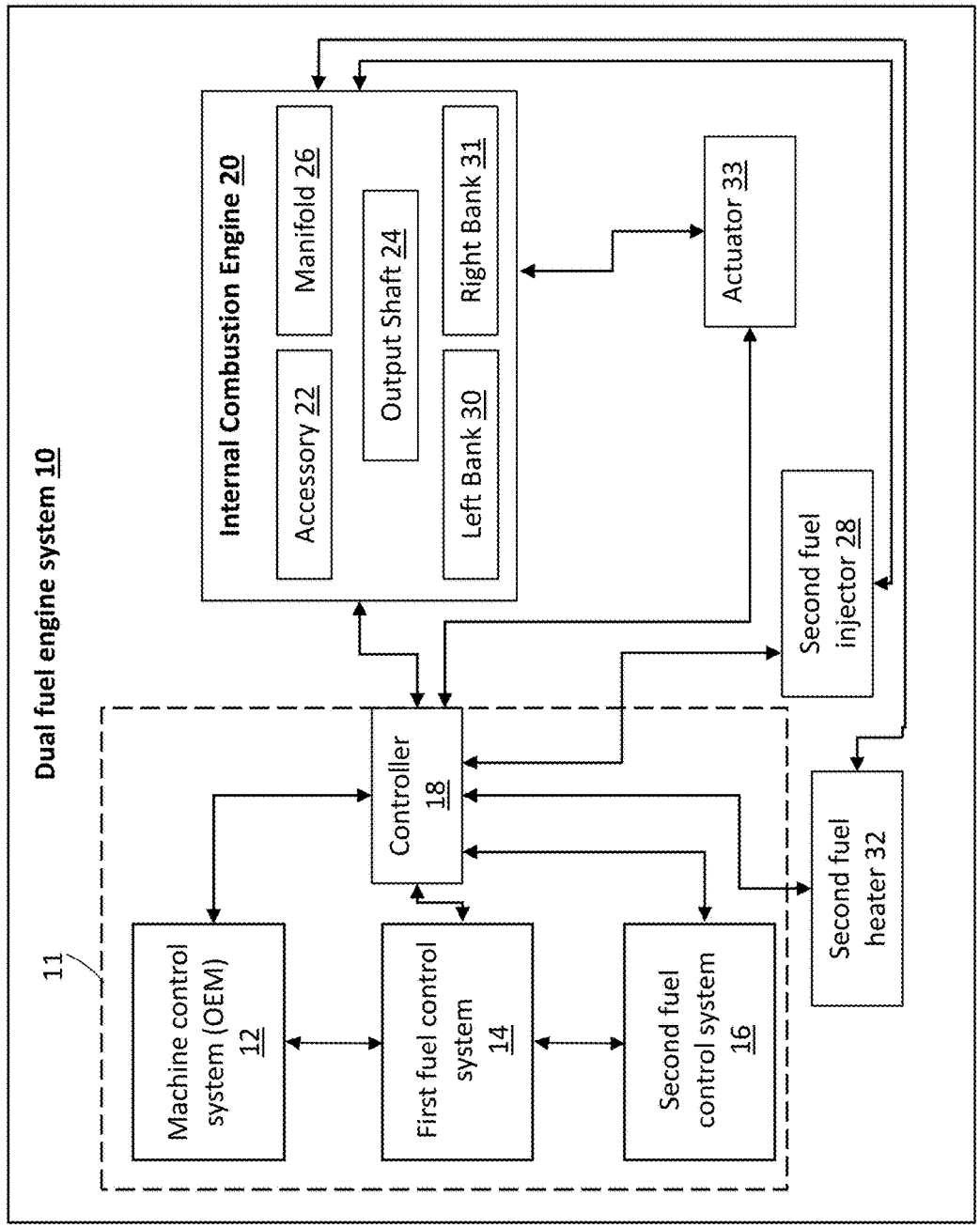
FIG. 1 is a block diagram of a dual fuel engine system, according to at least one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are contemplated and made part of this disclosure.

The present disclosure pertains at least in part to systems and methods providing for reduced operating cost, improved efficiency and/or improved performance of a dual fuel engine system. In some embodiments, such systems and methods allow for meeting target emission levels. In some embodiments, protocols for control of the dual fuel engine are adjustable to streamline interfacing among, for example, a diesel engine ECM, gas controllers, and OEM controllers. In various embodiments, the dual fuel engine system (and associated methods of operation) is tailored to maximize the use of a less-expensive gas fuel and minimize the use of diesel fuel while meeting performance and emissions requirements and maintaining robust engine protection. In particular, to meet Tier 4 emissions regulations with a dual fuel engine system, precise and robust control of a dual fuel engine system is needed. Such precise and robust control includes, but is not limited to, control of a gas or liquid fuel system, a second fuel type system (e.g., diesel, gas, etc.), and aftertreatment system included within the dual fuel engine system. The present disclosure outlines a system and method for precise and robust control of a dual fuel engine system including accurately determining (e.g., by measuring or estimating) multiple engine parameters (e.g., brake power, friction power, accessory power, a first fuel (e.g., diesel, gas, liquid fuel) power, a second fuel (e.g., gas, liquid) power, a second fuel (e.g., gas, liquid) substitution rate, fuel quality parameter associated with the second fuel (e.g., methane number), LHV, a second fuel (e.g., gas, liquid) temperature, a second fuel (e.g., gas, liquid) pressure, knock intensity, exhaust temperature, etc.) and using the determined parameters as inputs for determining appropriate commands for one or more actuators within the dual fuel engine system. The system and methods described herein are applicable to new engine builds or for retrofitting onto existing Tier 4 diesel engine systems. Advantageously, the systems and methods described herein are lower in cost and complexity as compared to typical port gas injection or cylinder pressure sensing systems.

Referring to FIG. 1, a block diagram of a dual fuel engine system 10 is shown, according to an exemplary embodiment. The dual fuel engine system 10 is configured to be an engine having a dual fuel operation mode, the engine configured to operate using two different fuels. The engine can be configured to operate using a first fuel and a second fuel, where the first fuel and the second fuel have different properties and/or chemical compositions. The properties can include auto-ignition temperatures, flame speeds, etc. The fuels can include diesel and natural gas, for example. For example, the first fuel can be a diesel fuel. The second fuel can be, for example, natural gas, an e-fuel or liquid biofuel. The liquid biofuel can be methanol and/or ethanol, for example. The first fuel or the second fuel can be any one of a high cetane number fuel, such as diesel, gas-to-liquid (GTL) diesel, heavy fuel oil (HFO), low sulfur fuel oil (LFSO), hydrotreated vegetable oil (HVO), marine gas oil (MGO), renewable diesel, biodiesel, paraffinic diesel, dimethyl ether (DME), F-76fuel, F-34 fuel, jet A fuel, JP-4 fuel, JP-8 fuel, or oxymethylene ether (OME), or a low cetane number fuel (e.g., a high octane number fuel, a high methane number fuel). The low cetane number fuel can be natural gas, hydrogen, ethane, propane, butane, syngas, ammonia, methanol, ethanol, or gasoline. The first fuel and/or the second fuel can optionally be a blend of fuels. It should be appreciated that the foregoing are merely examples of fuels, and other types of first and second fuels are not precluded. In various embodiments, the dual fuel engine system 10 is configured for one or more oil and gas production applications (e.g., land based oil and/or gas drilling and hydraulic fracturing).

As shown in FIG. 1, the dual fuel engine system includes an internal combustion engine 20, which is operably coupled to a control system 11 via at least one controller 18. The control system 11, which includes a machine control system (OEM system) 12, a first fuel control system 14, and a second fuel control system 16, is configured to send one or more inputs to the controller 18, where the controller 18 then controls the internal combustion engine 20. In various embodiments the first fuel control system 14 and its components are configured to operate using the first fuel. In other embodiments, the second fuel control system 16 and its components are configured to operate using the second fuel. For example, in various embodiments, the first fuel control system 14 is a diesel control system and the second fuel control system 16 is a gas control system. In other embodiments, the first fuel control system 14 is a first gas control system and the second fuel control system 16 is a second gas control system. In yet other embodiments, one or both of the first fuel control system 14 and the second fuel control system 16 can be liquid fuel control systems.

In yet other embodiments, the first fuel control system 14 and its components are configured to operate using the second fuel and the second fuel control system 16 and its components are configured to operate using the first fuel. In yet other embodiments, each of the first fuel control system 14 and the second fuel control system 16 and their respective components can selectively operate using either the first fuel or the second fuel. In various embodiments, the first fuel control system 14 and the second fuel control system 16 cooperatively operate within the internal combustion engine 20.

In various embodiments, the controller 18 is configured to include a processor and a non-transitory computer readable medium (e.g., a memory device) having computer-readable instructions stored thereon that, when executed by the processor, cause the at least one controller 18 to carry out one or more operations. In various embodiments, the at least one controller 18 is a computing device (e.g., a microcomputer, microcontroller, or microprocessor). In other embodiments, the at least one controller 18 is configured as part of a data cloud computing system configured to receive commands from a user control device and/or remote computing device.

The following description generally relates to a system in which the first fuel control system 14 operates using the first fuel and the second fuel control system 16 operates using the second fuel, however, it should be understood that in other embodiments, each of the first and second fuel control system 14, 16 can be selectively configured to operate using either the first fuel or the second fuel, as described above. The controller 18 is also operably coupled to at least one second fuel injector 28 to facilitate injection of the second fuel, at least one second fuel heater 32 structured to heat the second fuel, and at least one actuator 33. In some embodiments, the second fuel injector 28 is a gas injector. In other embodiments, the second fuel injector 28 is a liquid fuel injector. In various embodiments, the at least one second fuel heater 32 is a gas heater, configured to heat gas. In some embodiments, the at least one second fuel heater 32 is a liquid fuel heater configured to heat liquid fuel. In other embodiments, the dual fuel engine system 10 does not include a second fuel heater. In some embodiments, each of the second fuel injector 28, the heater 32, and the actuator 33 are operably coupled to the internal combustion engine 20. In various embodiments, the second fuel injector 28 is configured to control or facilitate injection of the second fuel (e.g., gas or a liquid, or a second gas) into the internal combustion engine 20. The at least one second fuel heater 32 is configured to adjust a temperature of the second fuel flowing within the internal combustion engine 20. The actuator 33 can include one or more first fuel type (e.g., diesel type or other liquid type, first gas type) actuators, air handling actuators, aftertreatment actuators, or any other type of actuator within the dual fuel engine system 10. Accordingly, during operation, the controller 18 can send one or more inputs to one or more of the internal combustion engine 20, the second fuel injector, 28, the heater 32, or the actuator 33 to facilitate a desired mode of operation of the dual fuel engine system 10.

As shown, the internal combustion engine 20 includes an output shaft 24 and may also include one or more accessories 22. The internal combustion engine 20 further includes at least one manifold 26. In various embodiments, the at least one manifold 26 includes, but is not limited to an intake manifold. The internal combustion engine 20 also includes at least one engine cylinder bank. In some embodiments, the at least one engine cylinder bank includes a left bank 30 and a right bank 31. During operation of the dual fuel engine system 10, the control system 11 can receive one or more inputs from a user and/or one or more sensors within the dual fuel engine system 10 and control operation of at least one of the internal combustion engine 20, the second fuel injector 28, or the actuator 33 via the controller 18.

Figure 2:
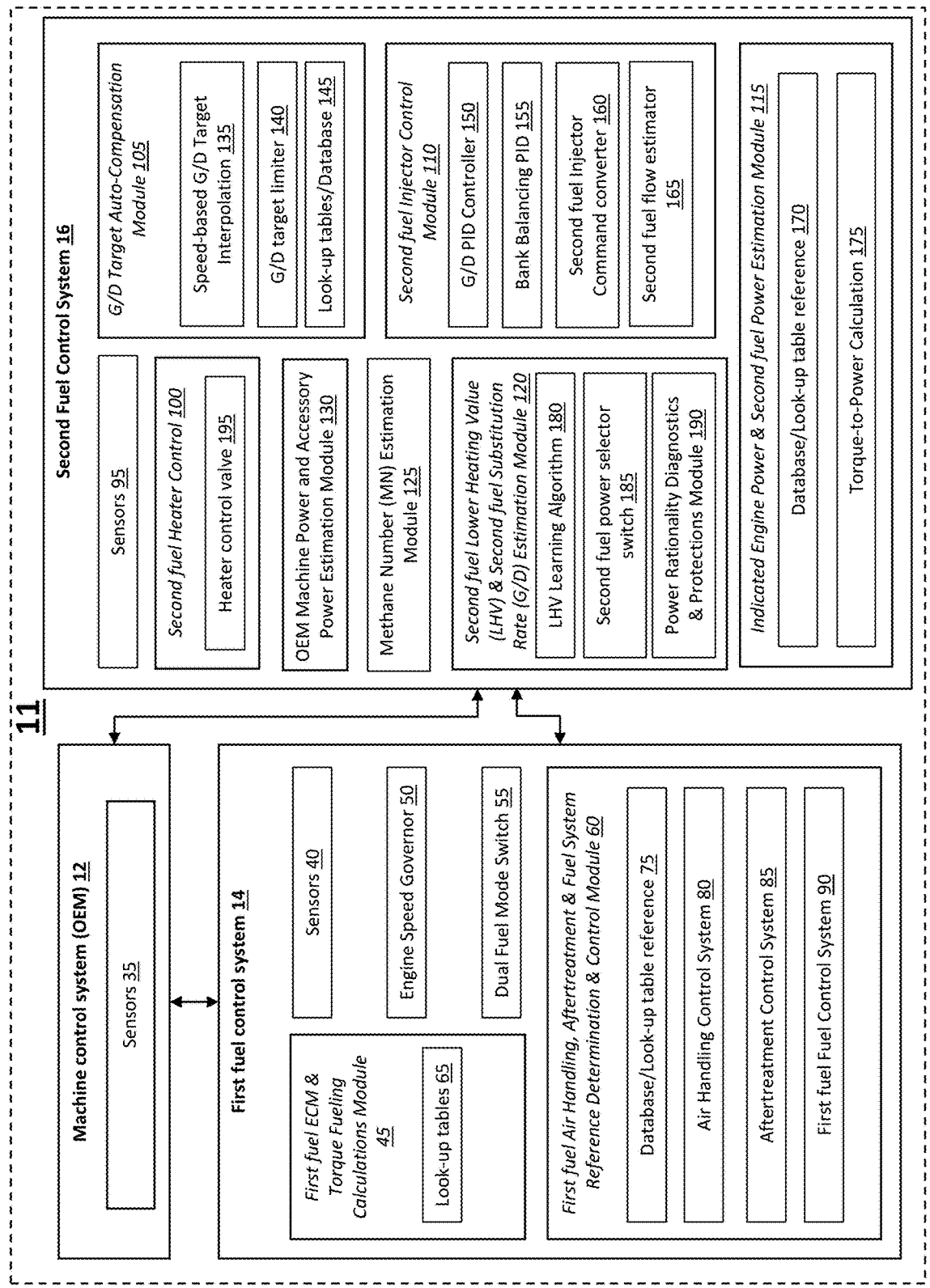
FIG. 2 is a block diagram of a control system of the dual fuel engine system of FIG. 1, according to at least one embodiment.

FIG. 2 is a block diagram of the control system 11 of the dual fuel engine system 10, according to an exemplary embodiment. As shown, the OEM system 12 can include one or more sensors 35, which are each coupled to one or more corresponding components within the dual engine system 10. In various embodiments, the one or more sensors 35 can be operably coupled to or in communication with a fracturing ("frac") pump, accessories, one or more inlets or outlets of the internal combustion engine 20, or any other component within the dual fuel engine system 10 (e.g., cooling fan, flywheel, brakes, etc.). The OEM system 12 can include one or more processors configured to receive inputs from the sensors 35. In various embodiments, the one or more inputs from the sensors 35 can include a power estimate, a frac pump speed, a frac pump discharge pressure, a dual fuel mode activation request, or any other input detectable by the one or more sensors 35. As shown, the OEM system 12 is communicably coupled to each of the first fuel control system 14 and the second fuel control system 16, where the OEM system 12 can output information sensed by the one or more sensors 35 or can receive inputs from the first fuel control system 14 and/or the second fuel control system 16.

As shown in FIG. 2, the first fuel control system 14 includes one or more sensors 40, which are coupled to or disposed adjacent to one or more components within the internal combustion engine 20. In various embodiments, the one or more sensors 40 can be configured to determine (e.g., sense, detect, measure) at least one of an engine speed, an intake manifold temperature, an engine coolant temperature, an oil temperature, a cooling fan duty cycle, a first fuel (e.g., diesel, first gas, or other liquid) rate, or an operational state of a dual fuel mode switch 55. In various embodiments, the dual fuel mode switch 55 can be configured to switch operation of the internal combustion engine 20 between single or dual fuel modes. Additionally, or alternatively, the one or more sensors 40 can be configured to determine a lower heating value (LHV) of the second fuel (e.g., gas, liquid, or a second gas). In yet other embodiments, the one or more sensors 40 can be configured to determine one or more parameters indicative of the LHV, which can include, but are not limited to, a second fuel (e.g., gas, liquid, or second gas) density or a speed of sound. The first fuel control system 14 also includes an engine speed governor 50. In various embodiments, the engine speed governor 50 can include one or more controllers configured to control a speed of the internal combustion engine 20.

The first fuel (e.g., diesel or a first gas) control system 14 also includes a first fuel (e.g., diesel or a first gas) engine control system (ECM) and a torque fueling calculations module 45. In various embodiments, the torque fueling calculations module 45 can include one or more processors in communication with one or more reference databases or repositories, where the one or more processors are configured to reference data stored within the databases in order to carry out torque calculations related to the internal combustion engine 20. For example, in various embodiments, the torque fueling calculations module 45 is configured to calculate a torque based on one or more known parameters. In various embodiments, the module 45 is configured to receive inputs corresponding to a dual fuel mode operation condition, an engine friction parameter, an accessory ("parasitic") torque parameter, engine speed, an OEM machine power estimate, and an engine accessory power estimate (e.g., gas controller, liquid fuel controller, flywheel, etc.). In various embodiments, the one or more reference databases or repositories can include look-up tables 65. In various embodiments, the one or more look-up tables 65 includes one or more chi-tables. In various embodiments, the look-up tables 65 can include reference information related to engine torque, engine speed, engine friction parameters, parasitic or accessory torque parameters, first fuel (e.g., diesel or a first gas) fuel rates, intake manifold temperatures, and/or an engine coolant temperature. In various embodiments, the engine friction parameters of the look-up tables 65 can be based on at least one of an oil temperature or a coolant temperature. In some embodiments, the parasitic or torque parameters of the look-up tables 65 can be based on a cooling fan duty cycle (i.e., of a cooling fan within the internal combustion engine 20). In various embodiments, the module 45 is configured to determine at least one of a total fueling amount of the first fuel (e.g., diesel or a first gas), an approximate equivalent total fueling amount, an equivalent total fueling amount (i.e., a second fuel fueling equivalent of the fueling amount of the first fuel), a friction torque estimate, or a first fuel rate.

The first fuel control system 14 also includes a first fuel (e.g., diesel or a first gas) air handling, aftertreatment and fuel system reference determination and control module 60. In various embodiments, the control module 60 can include at least one processor in communication with a database (e.g., look-up tables) 75. In various embodiments, the database 75 includes a data repository relating engine speed, fueling amounts (e.g., equivalent total fueling amount, approximate equivalent total fueling amount), second fuel (e.g., gas, liquid, or a second gas) substitution rate (G/D), compressor inlet density (CID), or any other related parameters. Accordingly, the one or more processors within the control module 60 are configured to reference data stored within the database 75 to determine one or more system inputs for at least one of an air handling control system 80, an aftertreatment control system 85, or a first fuel control system 90. In various embodiments, the one or more system inputs includes, but is not limited to, an actuator command, or a target (e.g., a set point, operating threshold, etc.) for at least one of the first fuel air handling control system 80, aftertreatment control system 85, or first fuel control system 90.

As shown in FIG. 2, the second fuel (e.g., gas, liquid, or a second gas) control system 16 can include one or more sensors 95, which are coupled to or disposed adjacent to one or more components within the internal combustion engine 20. In various embodiments, the one or more sensors 95 can be configured to determine (e.g., sense, detect, measure, etc.) at least one of an OEM machine torque, an accessory torque, a fuel quality parameter associated with the second fuel, a second fuel injector pressure, a second fuel supply pressure, a second fuel flow amount, an engine bank exhaust temperature, an aftertreatment system temperature, an LHV, a second fuel temperature, a dual fuel mode input, a knock intensity, G/D, or any other related parameter. In various embodiments, the fuel quality parameter associated with the second fuel can be a knock propensity indicator, or a knock propensity index. In some embodiments, the knock propensity index (KPI) can be an index that correlates a fuel composition (i.e., of the second fuel) to a knock propensity of an engine (i.e., the engine 20) operating with the fuel (i.e., the second fuel). In some embodiments, the KPI can be a methane number (MN), an octane number, an anti-knock index (AKI), or any other parameter known in the art. In various embodiments, the KPI can be the MN when the second fuel is natural gas. In various embodiments, the KPI can be the octane number or the AKI when the second fuel is gasoline. In some embodiments, the engine bank exhaust temperature can correspond to a left bank average exhaust temperature and/or a right bank average exhaust temperature. In some embodiments, a bank average exhaust temperature can be calculated by averaging the measurements from individual exhaust port temperature sensors. In some embodiments, the exhaust port temperature sensors can be among the at least one sensors 35, 40, and/or 95. The second fuel control system 16 also includes an OEM machine power and accessory power estimation module 130. In various embodiments, the OEM machine power and accessory power estimation module 130 can include one or more processors configured to estimate an OEM machine power and/or accessory power based on one or more inputs received by the one or more sensors 95 (and/or from the sensors 35, 40). In some embodiments, the accessory power can be a power associated with one or more accessory components and/or output shafts (e.g., output shaft 24) within the dual fuel engine system 10. In various embodiments, the OEM machine power and accessory power estimation module 130 is configured to receive inputs related to an OEM machine power estimate, an accessory torque measurement, a pump speed, a pump discharge pressure, and an engine speed, where the one or more processors then estimate an accessory power estimate based on the inputs. Similarly, the second fuel control system 16 also includes a KPI (e.g., MN) estimation module 125. In various embodiments, the KPI estimation module 125 can include one or more processors configured to estimate a KPI associated with the internal combustion engine 20 based on one or more inputs received by the one or more sensors 95 (and/or from the sensors 35, 40). In various embodiments, at least one of the sensors 35, 40, or 95 may be assigned or partitioned to any of the different control systems (e.g., OEM system 12, first fuel control system 14, second fuel control system 16) within the dual fuel engine system 10 without changing overall functionality of the sensors. For example, in various embodiments, the sensors 95 may be included within or operably coupled to any of the OEM system 12 the first fuel control system 14, or the second fuel control system 16. Similarly, the sensors 35 may be included within or operably coupled to any of the OEM system 12, the first fuel control system 14, or the second fuel control system 16. The sensors 40 also may be included within or operably coupled to any of the OEM system 12, the first fuel control system 14, or the second fuel control system 16.

The second fuel control system 16 also includes an indicated engine power and second fuel (e.g., gas, liquid, or a second gas) estimation module 115. The engine power and second fuel estimation module 115 can include one or more processors, which are configured to receive one or more inputs related to operation of the dual fuel engine system 10. The engine power and second fuel estimation module 115 can be further configured to determine, using a database 170 and/or a torque-to-power calculation system 175, at least one of a thermal efficiency estimate, a first power estimate of the second fuel (e.g., gas, liquid, or a second gas), an indicated power estimate of the first fuel (e.g., diesel, first gas, or other liquid), a net engine power estimate, an intake manifold temperature (e.g., a maximum intake manifold temperature), and/or other related parameters. In various embodiments, the database 170 is a look-up table. In some embodiments, the torque-to-power calculation system 175 can be or include computer logic. In various embodiments, the engine power and second fuel estimation module 115 is configured to receive one or more inputs corresponding to a G/D estimate, a friction torque estimate, an accessory ("parasitic") torque estimate, a first fuel rate, an engine speed, an intake manifold temperature, and/or a MN estimate. In embodiments, the KPI estimate is determined by the KPI module 125. Although the terms "torque" and "power" are used in various instances throughout the disclosure, it should be understood that in various embodiments, torque can be used in place of power or vice versa. For example, it should be understood that power can be calculated from torque and speed and vice versa. In yet other embodiments, any other parameter indicative of a load (e.g., alternatively or in addition to torque and/or power) can be determined and/or used in operations carried out by the control system 11.

The second fuel control system 16 also includes a second fuel (e.g., gas, liquid, or a second gas) LHV and G/D estimation module 120. The LHV and G/D estimation module 120 can include a second fuel (e.g., gas, liquid, or a second gas) power selector switch 185, a LHV learning algorithm 180 configured to process one or more received inputs, and a power rationality diagnostics and protections module 190. In various embodiments, the LHV learning algorithm 180 includes a filter (e.g., a low-pass filter, a moving average filter, etc.) and/or an adaptive learning routine. In some embodiments, the one or more inputs are received from the sensors 95. The LHV and G/D estimation module 120 can include one or more processors configured to receive inputs including a total flow estimate of the second fuel (i.e., of the second fuel flowing within the engine system 10), a thermal efficiency estimate, an indicated power estimate of the first fuel, and a first indicated engine power estimate. In various embodiments, the one or more processors of the LHV and G/D estimation module 120 can be received from the sensors 35, 40, and/or 95. The LHV and G/D estimation module 120 can consequently estimate a G/D amount and an LHV amount associated with the internal combustion engine 20. In various embodiments, the one or more processors within the LHV and G/D estimation module 120 can determine the LHV and the G/D estimate amount by multiplying the total flow estimate of the second fuel by the thermal efficiency estimate and using the result to normalize the first power estimate of the second fuel (e.g., by dividing the first power estimate of the second fuel by the product of the total flow estimate of the second fuel and the thermal efficiency estimate) to determine an instantaneous LHV amount. The LHV learning algorithm 180 can process the instantaneous LHV amount to then determine (i.e., learn) the LHV estimate. In various embodiments, the second fuel power selector switch 185 can be configured to receive inputs corresponding to first and second power estimates. In some embodiments, the second fuel power selector switch 185 can also be configured to use the first and second power estimates to output a final power estimate of the second fuel. In various embodiments, the final power estimate of the second fuel is based on a maximum or minimum of the first and second power estimates. In various embodiments, the power rationality diagnostics and protections module 190 can include one or more processors configured to receive inputs corresponding to the first and second indicated engine power estimates. In some embodiments, the power rationality diagnostics and protections module 190 is further configured to, based on and responsive to a comparison of one or both of the first and second indicated engine power estimates to one or more thresholds, initiate one or more diagnostic operations or engine protective protocols.

As shown, the second fuel control system 16 further includes a G/D target auto-compensation module 105. In various embodiments, the G/D target auto-compensation module 105 is configured to adjust or compensate the G/D target of the internal combustion engine 20. The module 105 is configured to receive one or more inputs indicating an engine speed, an engine load (e.g., power, torque, etc.), an intake manifold temperature, and/or a KPI estimate. In various embodiments, one or more inputs are received by the module 105 from the sensors 95, 35, and/or 40. In some embodiments, the one or more inputs received by the module 105 are processed by a speed-based G/D target interpolation unit 135 to determine the G/D target based on the indicated engine speed. In various embodiments, the speed-based G/D target interpolation unit 135 determines the G/D target based on the indicated engine speed by using data stored in one or more databases 145. In some embodiments, the one or more databases 145 can include one or more look-up tables. The module 105 also includes a G/D target limiter 140, which includes one or more processors configured to determine a G/D target limiting value based on one or more inputs. In various embodiments, the one or more inputs can include an engine knock, an exhaust temperature, and/or a first fuel amount. In various embodiments, the exhaust temperature corresponds to an exhaust temperature of an engine bank. The second fuel control system 16 can use the G/D target limiting value, together with a first indicated engine power estimate, to determine a second fuel power target value.

As shown in FIG. 2, the second fuel control system 16 includes a second fuel injector control module 110, which includes at least one G/D proportional-integral-derivative (PID) controller 150. In various embodiments, the PID controller 150 is configured to receive a feedforward input, the feedforward input being based on a second fuel injector pressure and a temperature compensated second fuel flow target. In various embodiments, the second fuel injector pressure and temperature can be measured by the sensors 95, 35, and/or 40. The controller 150 can also receive a feedback input corresponding to the G/D estimate and a target input corresponding to the G/D controller. Responsive to receiving the feedforward, feedback, and target inputs, the PID controller 150 can output at least one base second fuel injector command. In various embodiments, the at least one base second fuel injector command is associated with at least one engine bank second fuel injector command. In some embodiments, the at least one engine bank second fuel injector command includes a left bank second fuel injector command and/or a right bank second fuel injector command.

A second fuel injector command converter 160 can be operably coupled to the PID controller 150. In various embodiments, the second fuel injector command converter 160 can include one or more processors configured to convert the base second fuel injector command to the at least one engine bank second fuel injector command. The second fuel injector control module 110 can also include a bank balancing PID controller 155. In various embodiments, the PID controller 155 is configured to receive a feedback input corresponding to a difference in exhaust temperatures between a left bank of the internal combustion engine 20 (e.g., left bank 30) and a right bank of the internal combustion engine 20 (e.g., right bank 31), and a target value associated with the exhaust temperature difference. In various embodiments, the target value is zero. Responsive to the feedback and target inputs, the PID controller 155 is configured to output a left bank correction amount and a right bank correction amount. In various embodiments, one or both of the left and right bank correction amounts can be either positive or negative values. The output left and right bank correction amounts can be each added to the base second fuel injector command (e.g., output from the PID 150), which the second fuel injector command converter 160 can convert to the respective left and right bank second fuel injector commands. The second fuel flow estimator 165 is configured to receive each of the left and right bank second fuel injector commands, together with a second fuel pressure and a second fuel temperature. In various embodiments, the second fuel flow estimator 165 can include or be coupled to one or more processors within the module 110. In some embodiments, the second fuel pressure and/or second fuel temperature are measured by the sensors 95, 35, and/or 40. In various embodiments, the second fuel flow estimator 165 is configured to output a total second fuel flow estimate associated with the internal combustion engine 20 based on the left and right bank second fuel injector commands, the second fuel pressure, and the second fuel temperature.

Finally, as shown in FIG. 2, the second fuel control system 16 includes a second fuel heater control module 100. In various embodiments, the second fuel heater control module 100 is configured to control an operational state of the at least one heater 32 coupled to the internal combustion engine 20. In various embodiments, the second fuel heater control module 100 includes one or more processors that are configured to receive one or more inputs from the at least one controller 18 and/or from other components within the control system 11. The one or more processors within the second fuel heater control module 100 can be configured to cause the second fuel heater control module 100 to change an operational state of the at least one heater 32. In some embodiments, changing the operational state of the at least one heater 32 can include adjusting an operational setting of a heater control valve 195 to control the operational state of the at least one heater 32. In various embodiments, the at least one heater 32 can be an electric heater. In other embodiments, the at least one heater 32 can be configured to provide heat using engine coolant.

Figure 3:
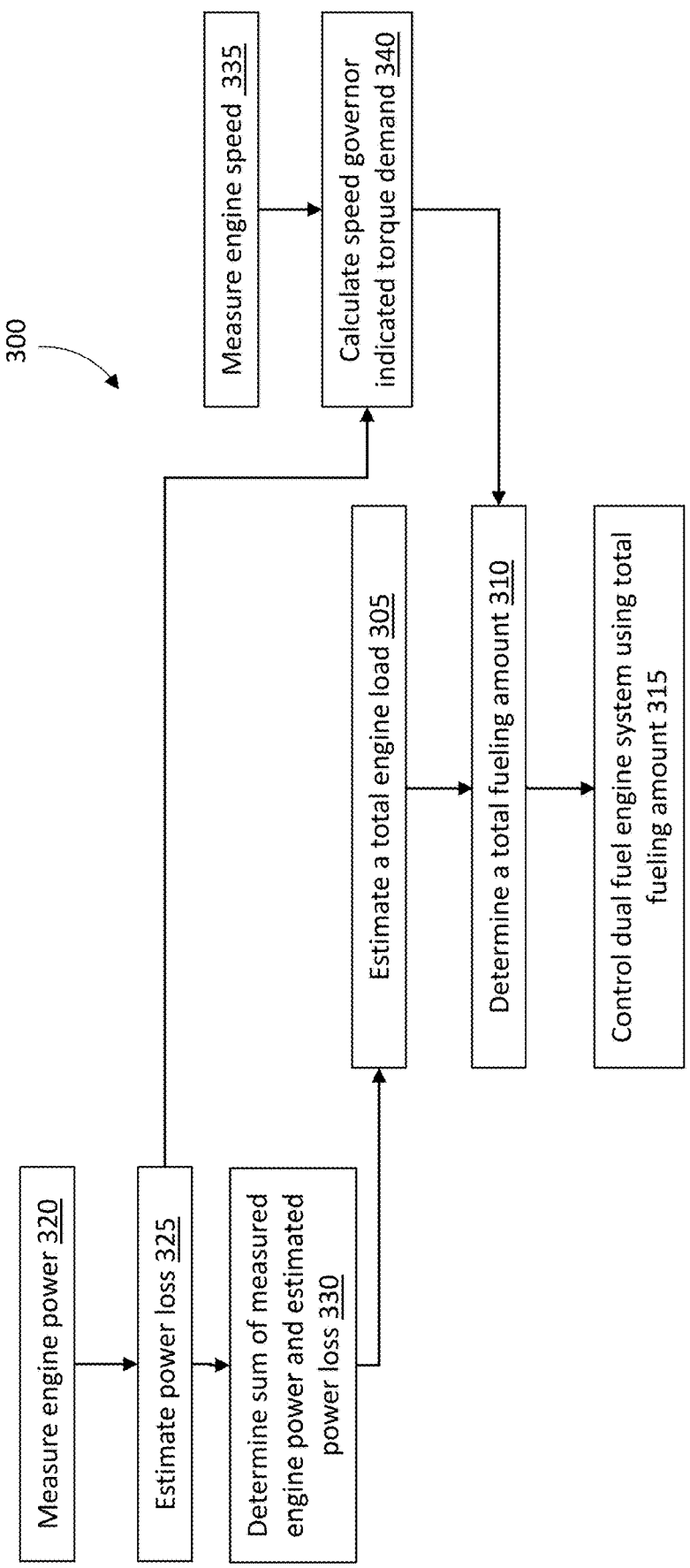
FIG. 3 is a flow diagram illustrating a method carried out by the control system of FIG. 2, according to at least one embodiment.

In various implementations, the engine control system 11, which includes the OEM system 12, the first fuel control system 14, and the second fuel control system 16, can cooperate to control the dual fuel engine system 10. FIG. 3 shows a flow diagram illustrating a method 300 of controlling the dual fuel engine system 10, according to an exemplary embodiment. In an operation 305, the engine control system 11 estimates a total engine load (e.g., power, torque, etc.) of the internal combustion engine 20. In various embodiments, the OEM system 12 calculates the total engine load by determining a first load amount ("primary load") transferred through the engine (e.g., via a flywheel, frac pump load, etc.) and broadcast the determined first load (e.g., via a datalink) to the first fuel control system 12 and/or the second fuel control system 16. In embodiments where the OEM system 12 controls accessory loads ("secondary load," e.g., cooling fan loads) within the dual fuel engine system 10, the OEM system 12 can estimate the accessory load, add the accessory load to the first load amount, and then broadcast the sum, which is indicative of the total engine load, (e.g., via the datalink) to the systems 14 and/or 16. The control system 11, in an operation 310, the control system 11 can determine a total fueling amount of the internal combustion engine 20. The control system 11, in an operation 315, can then control the dual fuel engine system 10 using the total fueling amount determined in the operation 310.

Figure 4:
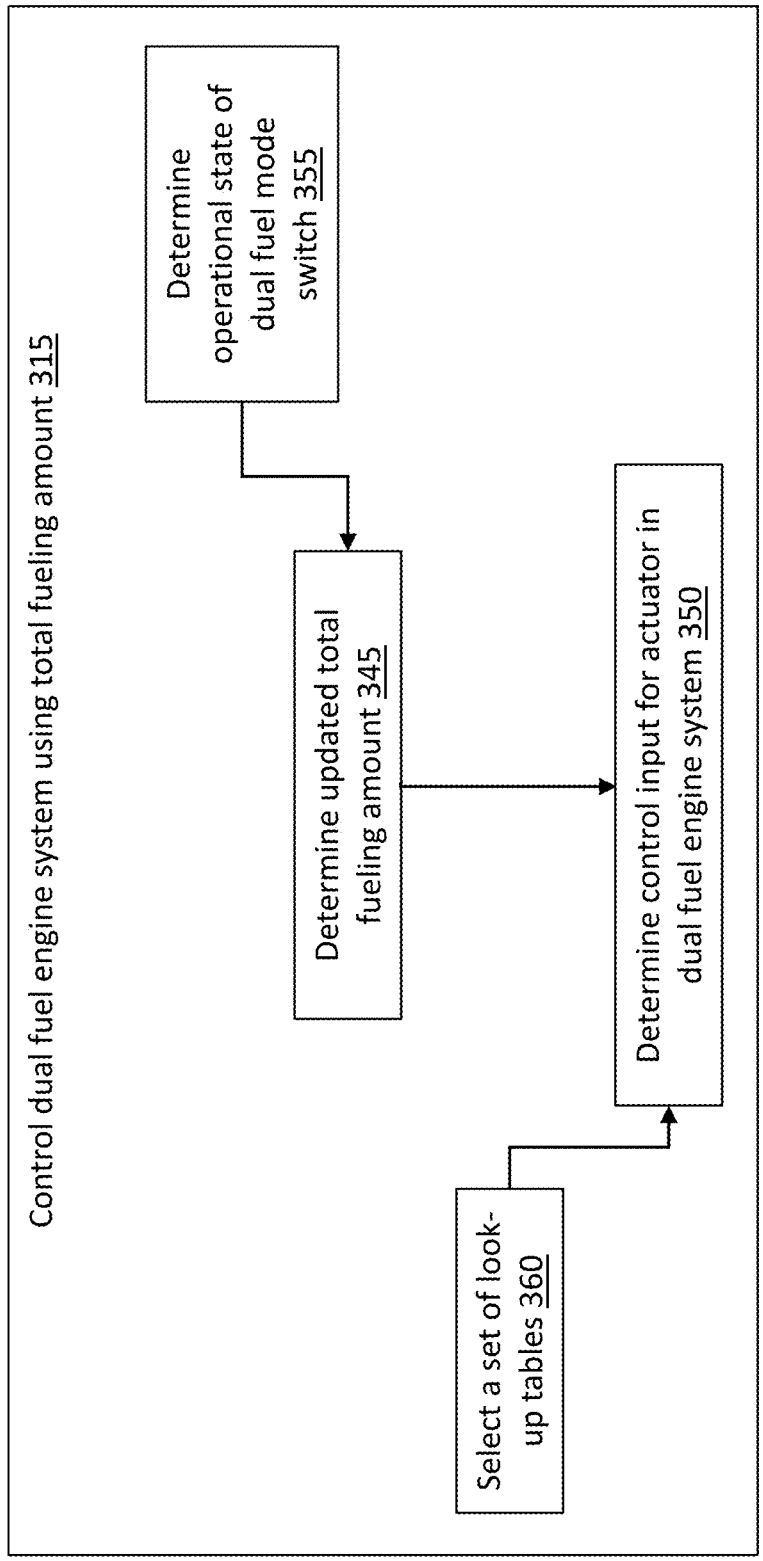
FIG. 4 is a flow diagram illustrating a method carried out by the control system of FIG. 2, according to at least one embodiment.

In various implementations, the control system 11 can estimate the total engine load (e.g., power, torque, etc.). In some implementations, the control system 11 estimates the total engine load in the operation 305 by measuring an engine power in an operation 320, estimating a power loss in an operation 325, and determining a sum of the measured engine power and estimated power loss in an operation 330. In some embodiments, the estimated total engine load can be based on an input received from the OEM system 12 (e.g., from one or more sensors, which may sense at least one of a pump discharge pressure, speed, current, or voltage) responsive to or indicative of an external load. The OEM system 12 may then use the input (i.e., the sensed information) to calculate an engine load. The OEM system 12 may then output the calculated load value to the second fuel control system 16 and/or the first fuel control system 14 using a datalink signal and/or an analog signal (e.g., 4-20 mA). In some embodiments, the external load corresponds to at least one of a generator or a pump operably coupled to the internal engine 20. In various implementations, the engine control system 11 can determine the total fueling amount in an operation 310. In some implementations, the control system 11 determines the total fueling amount in the operation 310 based, at least in part, on a measured engine speed 335 and a calculated speed governor indicated torque demand 340. As shown in FIG. 4, in various implementations, controlling the dual fuel engine system 10 in operation 315 can include determining an updated total fueling amount in an operation 345 and determining at least one control input for the at least one actuator 33 in an operation 350. In various embodiments, the at least one actuator 33 can be a first fuel system actuator. In various implementations, the updated total fueling amount determined in operation 345 can be based on determining an operational state of the dual fuel mode switch 55 in an operation 355. In various embodiments, the updated fueling amount determined in the operation 345 includes a first updated fueling amount and a second updated fueling amount. In some embodiments, the first updated fueling amount corresponds to a maximum between the total fueling amount and a fuel command for the first fuel (e.g., diesel, first gas, or other liquid). In some embodiments, the second updated total fueling amount is determined by subtracting the fuel command for the first fuel from the first total updated fueling amount to determine a first fuel equivalent of a second fuel fueling amount and adding the first fuel equivalent fueling amount to a second fuel command for the first fuel.

In various implementations, determining the control input for the at least one actuator 33 (in the operation 350) can be based on selecting a set of look-up tables. The information in the look-up tables can then be referenced in determining the control input. The look-up tables can contain information from one or more of the first fuel ECM and torque fueling calculations module 45, the first fuel air handling, aftertreatment and fuel system reference determination and control module 60, and/or the indicated engine power and second fuel power estimation module 115. The selection of the set of look-up tables can be performed in an operation 360. In various embodiments, selecting the set of look-up tables in the operation 360 includes determining a compressor inlet density (CID) of the internal combustion engine 20. In some embodiments, selecting the set of look-up tables in the operation 360 additionally or alternatively includes determining a G/D within the internal combustion engine 20. In other embodiments, selecting the set of look-up tables in the operation 360 additionally or alternatively includes determining an operational state of the dual fuel mode switch 55. In some embodiments, selecting the set of look-up tables in the operation 360 includes selecting at least one of an air handling reference table, an aftertreatment reference table, or a fueling reference table.

In various implementations, the control system 11 can determine a maximum amount between the total fueling amount (from operation 310) and a first fuel command for the first fuel. In various embodiments, the first fuel command for the first fuel is determined from the first fuel control system 14. In some embodiments, the control system 11 can be configured to determine a second updated total fueling amount. In various embodiments, the second updated fueling amount is determined by subtracting the first fuel command for the first fuel from the first updated total fueling amount to determine a first fuel equivalent of a second fuel fueling amount associated with the internal combustion engine and adding the first fuel equivalent of a second fuel fueling amount to a second fuel command for the first fuel to determine the second updated total fueling amount. In various embodiments, the control system 11 can determine at least one actuator command based on the engine speed and at least one of the first updated total fueling amount or the second updated total fueling amount. In some embodiments, the at least one actuator command can be associated with at least one of an actuator within the air handling control system 80, the aftertreatment control system 85, the first fuel control system 90, or the actuator 33.

In various embodiments, determining the total fueling amount in the operation 310 can include referencing one or more torque-to-fuel look-up tables. In various embodiments, the one or more torque-to-fuel look-up tables are determined or referenced from the first fuel ECM and torque fueling calculations module 45. In various embodiments, the look-up tables can be based on engine speed and an indicated first fuel torque input. In some embodiments, the indicated first fuel torque input can be determined by the sensors 35. In various embodiments, the indicated first fuel torque input determined in the operation 310 is based on a sum of a friction power estimate and an engine speed torque demand amount. In some embodiments, the engine speed torque demand amount corresponds to a difference between the engine speed and a predetermined engine speed target. In various embodiments, the control system 11 determines the power loss estimate in the operation 325. In some embodiments, the control system 11 determines the power loss estimate in the operation 325 by estimating a friction torque amount associated with the internal combustion engine 20, estimating an accessory torque amount, determining a charge air pumping torque amount, and determining the engine speed. In various embodiments, the engine speed is determined via the sensors 35, 40, and/or 95. in various embodiments, the charge air pumping torque amount is an estimate of a pumping loss associated with the dual fuel engine system 10, where the pumping loss corresponds to an amount of work done by the engine to ingest air into the engine to facilitate combustion and then expel combustion products into the atmosphere. In some embodiments, the charge air pumping torque can be measured using cylinder pressure data determined during engine development. In various embodiments, data determined during engine development may be used to calibrate a pumping torque virtual sensor (i.e., operably coupled to the OEM system 12, first fuel control system 14, and/or second fuel control system 16) configured to sense the charge air pumping torque amount.

In some implementations, the friction torque estimate can be determined from a look-up table. In various embodiments, the look-up table is determined or referenced from the first fuel ECM and torque fueling calculations module 45. In some embodiments, the look-up table is based on the engine speed and an engine friction parameter. In some embodiments, the engine friction parameter can correspond to an oil temperature or a coolant temperature within the internal combustion engine 20 of the dual fuel engine system 10. In various embodiments, the control system 11 can be configured to determine the accessory toque estimate from a look-up table. In various embodiments, the look-up table is determined or referenced from the first fuel ECM and torque fueling calculations module 45. In some embodiments, the look-up table is based on the engine speed and an accessory torque parameter. In various embodiments, the accessory torque parameter can correspond to a cooling fan power amount (e.g., a measurement or estimate) or a duty cycle commanded by the internal combustion engine 20 of the dual fuel engine system 10.

In various embodiments, the control system 11 is configured to determine the first fuel command for the first fuel from a torque-to-fuel look-up table. In various embodiments, the torque-to-fuel look-up table is determined or referenced from the first fuel ECM and torque fueling calculations module 45. In some embodiments, the torque-to-fuel look-up table is based on the engine speed (i.e., of the internal combustion engine 20) and a sum of a friction power estimate and a torque demand amount associated with the internal combustion engine 20. In various implementations, the torque demand amount is set by the engine speed governor 50.

Figure 5:
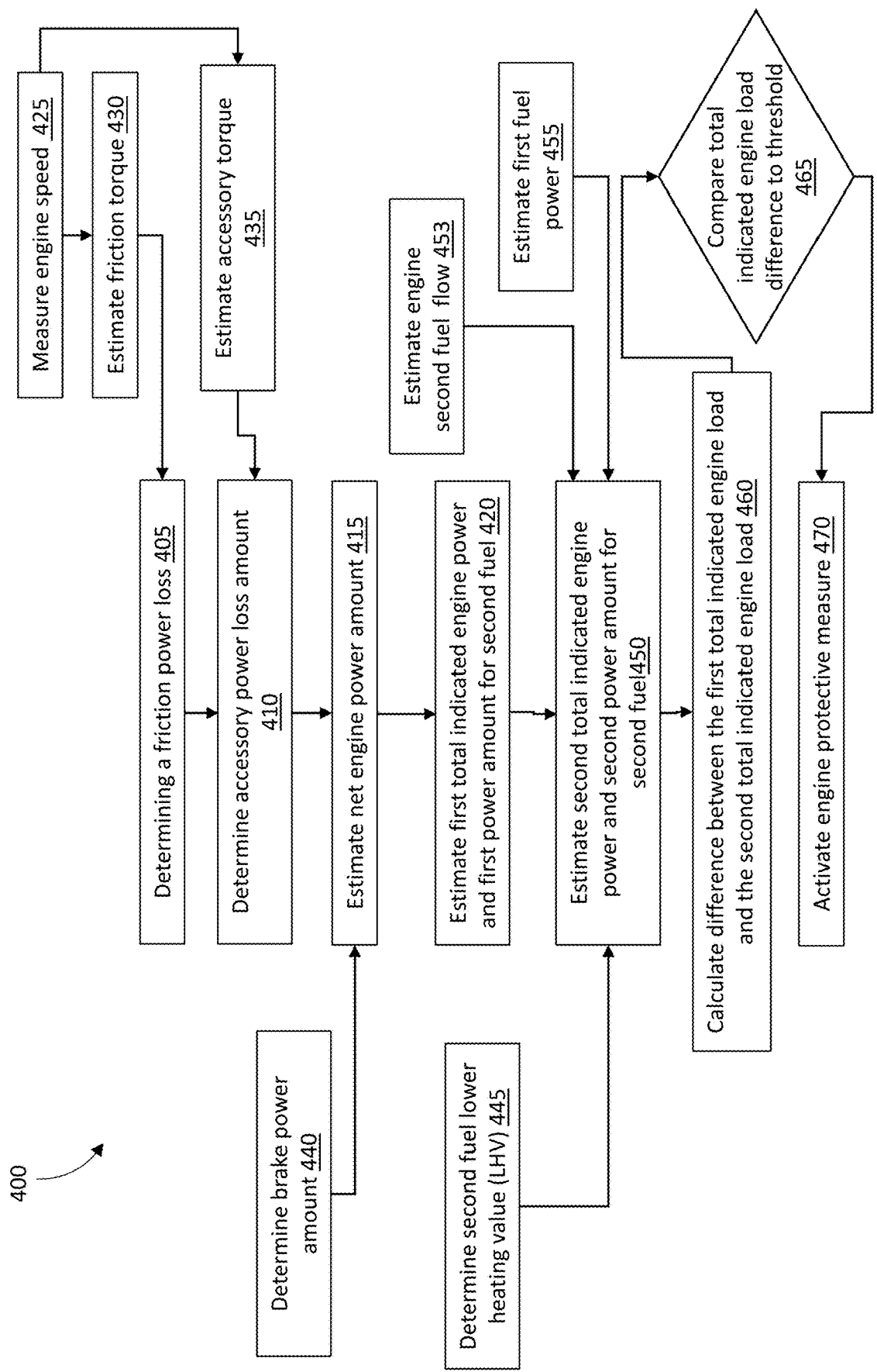
FIG. 5 is a flow diagram illustrating a method carried out by the control system of FIG. 2, according to at least one embodiment.

In various embodiments, the control system 11 can be configured to activate one or more protective measures associated with the internal combustion engine 20. In some embodiments, the control system 11 is configured to activate the one or more protective measures via the power rationality diagnostics and protections module 190. FIG. 5 shows a method 400 that can be implemented by the control system 11 to activate one or more engine protective measures. In an operation 405, the control system 11 is configured to determine a friction power loss amount. In various implementations, the friction power loss amount can be determined by measuring a speed of the internal combustion engine 20 in an operation 425 and estimating a friction torque amount in an operation 430. After determining the friction power loss amount in the operation 405, the control system 11 can determine an accessory power loss amount in an operation 410. In various embodiments, the accessory power loss amount can be associated with loads applied by the OEM system 12 (e.g., one or more cooling fans, pumps, alternators, etc.) and/or any other accessory component within or coupled to the internal combustion engine 20.

In various embodiments, the accessory power loss amount can be based on the measured engine speed (determined in the operation 425) and based on an estimated accessory torque amount determined in an operation 435. Using the accessory power loss amount and the friction power loss amount, the control system 11 can estimate a net engine power amount in an operation 415. In various embodiments, the net engine power amount can also be based on a brake power amount (e.g., engine dynamometer measurements) determined by the control system 11 in an operation 440. Using the estimated net engine power amount determined in the operation 415, the control system 11 can estimate a first indicated engine power and a first power amount for the first fuel in an operation 420. In various embodiments, the control system 11 can also estimate an indicated first fuel power. In some embodiments, the control system 11 is configured to estimate the indicated first fuel power by multiplying a determined thermal efficiency correction amount by a determined first fuel power estimate.

In some embodiments, determining the first fuel power estimate includes using a first look-up table. In various embodiments, the first look-up table is determined or referenced from the first fuel ECM and torque fueling calculations module 45. In some embodiments, the first look-up table is based on a first fuel rate and the engine speed. In various embodiments, determining the thermal efficiency correction amount includes referencing a first set of look-up tables. In some embodiments, the first set of look-up tables is determined or referenced from the first fuel ECM and torque fueling calculations module 45. In various embodiments, the first set of look-up table is based on a G/D of the internal combustion engine 20, a KPI associated with the internal combustion engine 20, and/or an intake manifold temperature within the internal combustion engine 20. In various embodiments, estimating the first power amount for the second fuel includes subtracting the indicated first fuel power from the indicated engine power.

The control system 11 can then estimate a second indicated engine power and a second power amount for the second fuel in an operation 450. In various embodiments, the second total indicated engine power and the second power amount of the second fuel can be based, at least in part, on a second fuel LHV value determined in an operation 445. In various embodiments, the LHV determined in the operation 45 can be based on the first power amount of the second fuel (determined in the operation 420), a total second fuel flow estimate, and the thermal efficiency correction amount. In some implementations, the LHV can be determined by an estimate. In various embodiments, the control system 11 can determine the LHV estimate by dividing the first power amount of the second fuel by a multiple of the second fuel flow estimate and the thermal efficiency correction amount. In various implementations, the resultant LHV is an instantaneous LHV amount. In some embodiments, the control system 11 can be configured to implement a learning algorithm to determine the LHV estimate from the instantaneous LHV amount.

In other embodiments, the second total indicated engine power and the second power amount of the second fuel can be based additionally or alternatively on an estimated engine second fuel flow amount (determined in an operation 453) and an estimated first fuel power amount (determined in an operation 455). In various embodiments, determining the second total indicated engine power includes determining a product of the total second fuel flow estimate and the LHV estimate, and summing the product of the total second fuel flow estimate and the LHV estimate with the first fuel power estimate. In some embodiments, the control system 11 can be configured to determine a first power estimate for the second fuel based on the first total indicated engine power and determine a second power estimate for the second fuel based on the LHV estimate and a product of a thermal efficiency parameter and the estimated engine second fuel flow amount. In various embodiments, the thermal efficiency parameter corresponds to the thermal efficiency correction amount. The control system 11 can then determine a final second fuel power estimate based on the first and second power estimates for the second fuel. In various embodiments, the control system 11 can be configured to estimate a G/D of the internal combustion engine 20. In various embodiments, the control system 11 is configured to estimate the G/D of the internal combustion engine 20 by dividing the final second fuel power estimate by the first total engine power estimate.

As shown in FIG. 5, the control system 11 can then calculate a difference between the first total indicated engine load (e.g., power, torque, etc.) (determined in the operation 420) and the second total indicated engine load (e.g., power, torque, etc.) (determined in the operation 450) in an operation 460. The control system 11 can then compare the difference between the first and second total indicated engine loads (calculated in the operation 460) to a predetermined threshold in an operation 465. For example, in various implementations, the control system 11 can determine a difference between the predetermined threshold and the difference between the first and second total indicated engine loads (i.e., total indicated engine load delta). In various embodiments, the predetermined threshold can be set by the OEM and/or a user of the dual fuel engine system 10.

Accordingly, if the difference between the total indicated engine load delta and the predetermined threshold is greater than a predetermined amount, the control system 11 can determine that the dual fuel engine system 10 is operating in an abnormal or adverse condition. In various embodiments, the predetermined threshold is associated with a predetermined period of time. In various embodiments, the predetermined threshold can be set, such as by the controller 18. For example, if the difference between the total indicated engine load delta and the predetermined threshold is greater than the predetermined amount for a predetermined period of time, the control system 11 can determine that the dual fuel engine system 10 is operating in an abnormal or adverse state. Accordingly, responsive to the control system 11 determining that the difference between the first and second total indicated engine loads satisfying the predetermined threshold (or that the total indicated engine load delta exceeds the predetermined amount), the control system 11 can activate one or more engine protective measures 470. For example, the control system 11 can disable dual fuel operation, perform a shut down, and/or cause a reduction in engine speed, etc.

Figure 6:
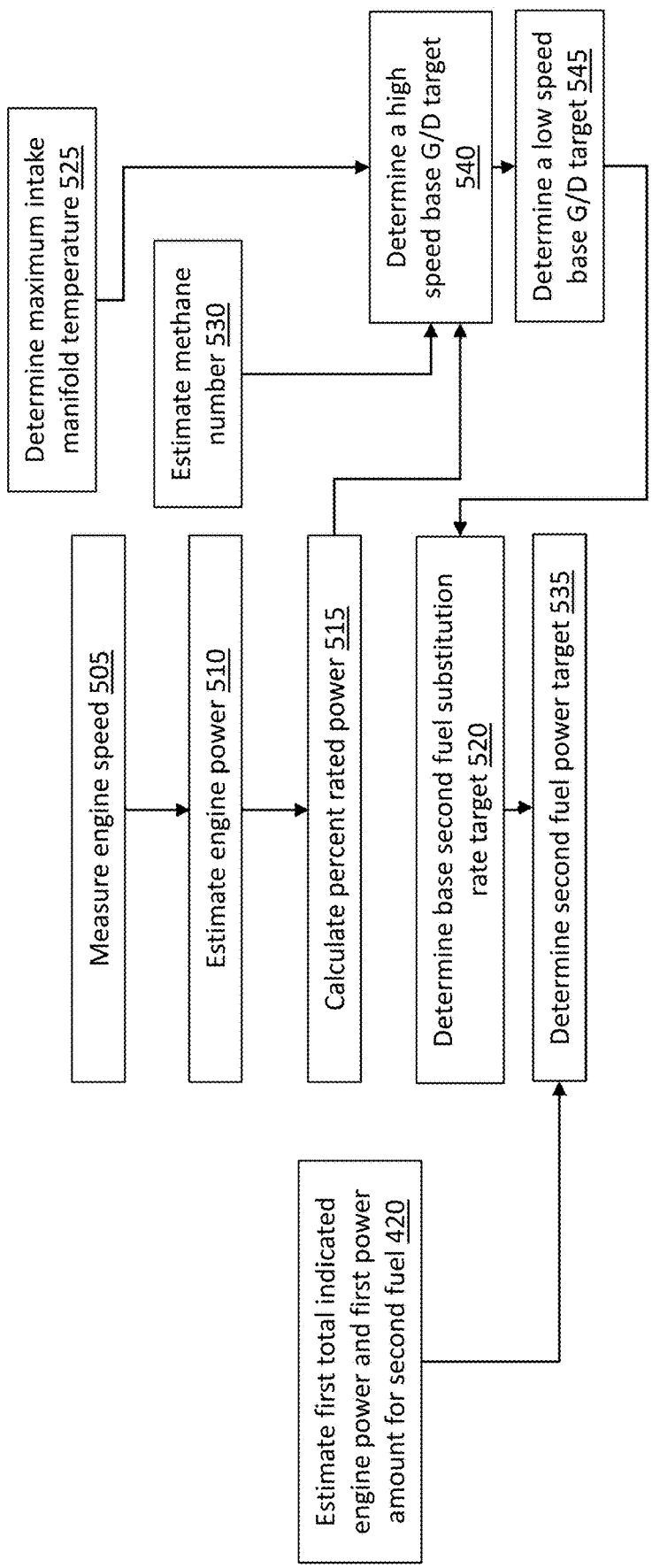
FIG. 6 is a flow diagram illustrating a method carried out by the control system of FIG. 2, according to at least one embodiment.

In other embodiments, the control system 11 can be configured to determine one or more second fuel power targets associated with the internal combustion engine 20. FIG. 6 shows a method 500 of determining a second fuel power target associated with the internal combustion engine 20. In an operation 505, the control system 11 measures the engine speed and estimates an engine power amount in an operation 510. In various embodiments, the engine speed is sensed by the sensor 95, 35, and/or 40. In some embodiments, the engine power amount is a net engine power amount. The control system 11 can calculate a percent of rated power ("percent power") of the internal combustion engine 20 in an operation 515 based on the estimated engine power from operation 510. The percent rated power may be calculated by dividing the net engine power by a rated engine power limit and multiplying by 100%. The control unit can also determine an intake manifold temperature (e.g., maximum intake manifold temperature) in an operation 525 and an estimate of the KPI of the second fuel in an operation 530.

In various embodiments, the control system 11 can determine a base second fuel substitution rate (G/D) target for the internal combustion engine 20 in an operation 520. In various embodiments, the control system 11 determines the base G/D target based on the engine speed, the percent rated power, the intake manifold temperature (determined in the operation 525), and the estimated KPI of the internal combustion engine 20. The control system 11 then determines a second fuel power target for the internal combustion engine 20 in an operation 535 based on the base second fuel substitution rate target determined in the operation 520. In various embodiments, the second fuel power target is based on the base G/D target and a first indicated engine power estimate. In some embodiments, the control system 11 determines the first indicated engine power estimate by carrying out the operation 420 of the method 400. In various embodiments, the control system 11 is configured to determine (e.g., calculate) the first indicated engine power based on the estimated engine power amount and a friction power loss amount.

In various embodiments, the base G/D target determined in the operation 520 is based on a first speed base G/D target when the engine speed is above a threshold, which can be determined in an operation 540, and a speed base G/D target when the engine speed is below the threshold, which can be determined in an operation 545. In various embodiments, at least one of the first speed base G/D target or the second speed base G/D target are determined based on the intake manifold temperature (determined in the operation 525) and/or the estimated KPI, such as a methane number (determined in the operation 530). In various embodiments, the first speed base G/D target is a high speed base G/D target and the second speed base G/D target is a low speed base G/D target (i.e., lower than the first base G/D target). In some embodiments, the high speed base G/D target is based on the percent rated power, the intake manifold temperature, and the KPI estimate. Similarly, the low speed base G/D target is based on the percent rated power, the intake temperature, and the KPI estimate. Accordingly, the base G/D target determined in the operation 520 is further determined by engine-speed based interpolation between the high speed base G/D target and the low speed base G/D target. In various embodiments, the high speed base G/D target is determined from a first set of look-up tables and the low speed base G/D target is determined from a second set of look-up tables (i.e., from the look-up tables/database 145).

Figure 7:
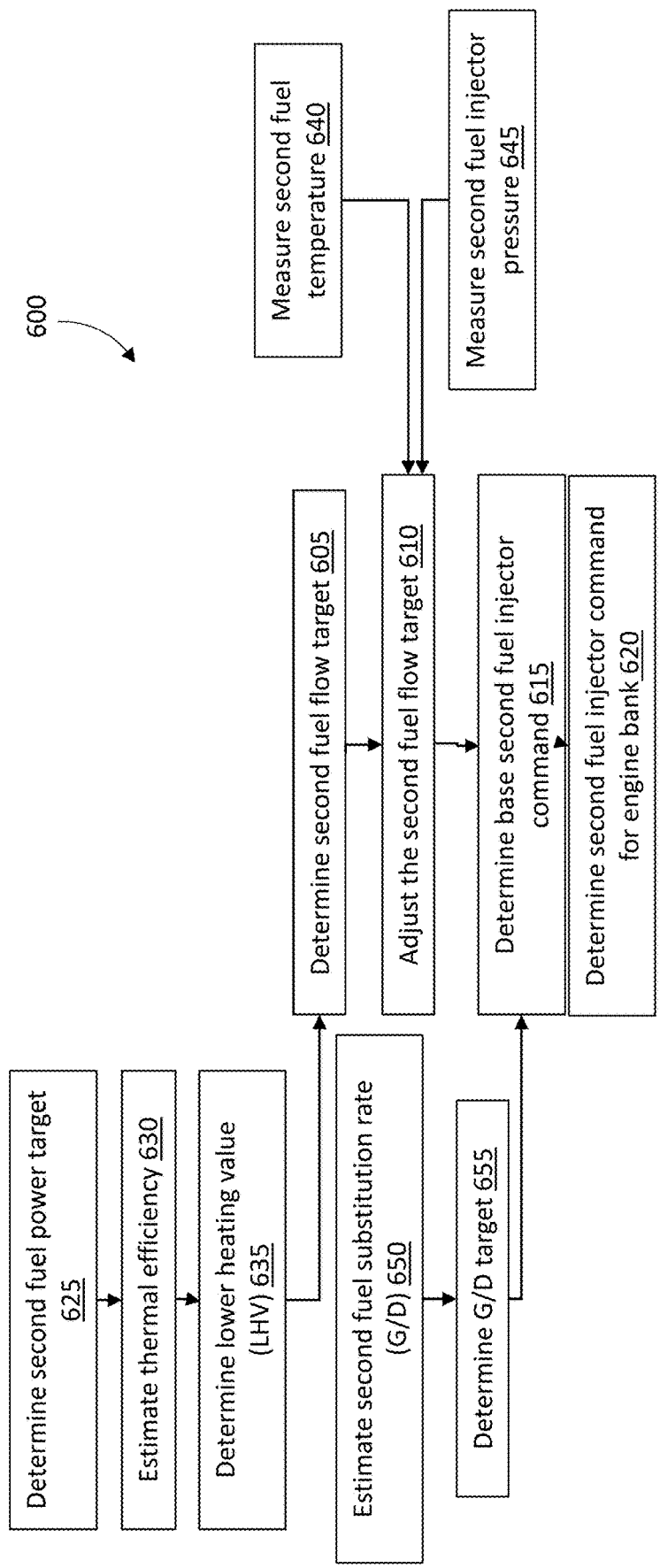
FIG. 7 is a flow diagram illustrating a method carried out by the control system of FIG. 2, according to at least one embodiment.

In various embodiments, the control system 11 can be configured to operate the dual fuel engine system 10 in order to determine one or more second fuel injector commands for at least one engine bank within the internal combustion engine 20. FIG. 7 illustrates a method 600 for determining at least one second fuel injector command for at least one engine bank within the internal combustion engine 20. In an operation 605, the control system 11 is configured to determine a second fuel flow target. In various implementations, the second fuel flow target is based on a second fuel power target determined in an operation 625, a thermal efficiency estimate determined in an operation 630, and an LHV determined in an operation 635. In some implementations, the second fuel power target determined in the operation 625 is determined by the control system 11 via the method 500. In other implementations, the LHV determined in the operation 635 is determined via the control system 11 carrying out one or more operations similar or equivalent to the operation 445. In other embodiments, the LHV determined in the operation 635 is determined via an LHV sensor or a look-up table based on the measured or estimated KPI. In various embodiments, determining the second fuel flow target in the operation 605 includes dividing the second fuel power target by the thermal efficiency estimate and the LHV.

The control system 11 is configured to adjust the second fuel flow target in an operation 610 based on at least one of a measured second fuel temperature determined in an operation 640 and/or a measured second fuel injector pressure in an operation 645. In various embodiments, at least one of the second fuel temperature or the second fuel injector pressure is measured by the sensors 35, 40, and/or 95. Using the adjusted second fuel flow target determined in the operation 610, the control system 11 is configured to determine at least one base second fuel injector command in an operation 615. In various embodiments, the at least one base second fuel injector command is further determined based on an estimated G/D of the internal combustion engine 20 determined in an operation 650, and a G/D target determined in an operation 655. In various implementations, the G/D target determined in the operation 655 is determined by the control system 11 by implementing one or more operations similar or equivalent to the operation 520. The control system 11 can then determine at least one second fuel injector command for at least one engine bank of the internal combustion engine 20 in an operation 620. In some embodiments, the second fuel power target is based on a first indicated engine power estimate and the G/D target. In various implementations, the first indicated engine power estimate is determined by the control system 11 by carrying out the operation 420. In some implementations, adjusting the second fuel flow target in the operation 610 includes calculating an adjusted second fuel flow target amount. In various embodiments, the second fuel flow target amount is based on a product of the second fuel flow target and at least one of the following: a first ratio of the measured second fuel temperature and a temperature reference amount, or a second ratio of the measured second fuel injector pressure and a pressure reference amount.

In various implementations, the control system 11 can be further configured to estimate a total second fuel flow amount. In various embodiments, the estimated total second fuel flow amount is based on the measured second fuel injector pressure (determined in the operation 645), the measured second fuel temperature (determined in the operation 640), and the at least one second fuel injector command for the at least one engine bank. In some implementations, the at least one second fuel injector command for the at least one engine bank includes a left bank second fuel injector command (i.e., for the left bank 30) and a right bank second fuel injector command (i.e., for the right bank 31). In other implementations, determining the left bank second fuel injector command and determining the right bank second fuel injector command includes biasing the at least one second fuel injector command for the at least one engine bank to each of the left bank 30 and the right bank 31.

In various embodiments, biasing the at least one second fuel injector command for the at least one engine bank to each of the left and right banks 30, 31 is based on an exhaust temperature difference associated with each of the left bank 30 and the right bank 31. In some embodiments, the exhaust temperature difference is measured by the sensors 35, 40, and/or 95. In other embodiments, the exhaust temperature difference corresponds to a difference in an exhaust temperature measured at the left bank 30 and an exhaust temperature measured at the right bank 31. Accordingly, during operation of the dual engine system 10, the control system 11 can measure the exhaust temperature of the left bank 30, measure the exhaust temperature of the right bank 31, and determine a difference between the exhaust temperature of the left bank 30 and the exhaust temperature of the right bank 31. The control system 11 can then add a left bank adjustment amount to the at least one second fuel injector command for the at least one engine bank. In various embodiments, the control system 11 adds the left bank adjustment amount to the at least one second fuel injector command to determine a first adjusted base second fuel injector command based on the difference between the left and right bank exhaust temperatures. Similarly, the control system 11 can then add a right bank adjustment amount to the at least one second fuel injector command for the at least one engine bank. In various embodiments, the control system 11 adds the right bank adjustment amount to the at least one injector command for the second fuel to determine a second adjusted base second fuel injector command based on the difference between the left and right bank exhaust temperatures. The control system 11 can then convert each of the first adjusted base second fuel injector command and the second adjusted base second fuel injector command respectively to the left bank second fuel injector command the right bank second fuel injector command.

In some implementations, determining the at least one second fuel injector command for the at least one engine bank in the operation 615 includes determining a feedforward input for a G/D PID controller, which is operably coupled to the internal combustion engine 20. In various embodiments, the G/D PID controller is the controller 150. In some embodiments, the feedforward input is based on a look-up table. In various embodiments, the look-up table is determined or referenced from the first fuel ECM and torque fueling calculations module 45, the first fuel air handling, aftertreatment and fuel system reference determination and control module 60, and/or the indicated engine power and second fuel power estimation module 115. In various embodiments, the look-up table is based on at least one of the measured second fuel injector pressure, the measured second fuel temperature, or the adjusted second fuel flow target amount. In some embodiments, the control system 11 is further configured to determine at least one heat control valve command. In various embodiments, the at least one heat control valve command is associated with the heater control valve 195. In some embodiments, the at least one heat control valve command is based on the measured second fuel temperature and/or a measured second fuel mass flow within the internal combustion engine 20. In yet other embodiments, the control system 11 is further configured to adjust at least one second fuel temperature setpoint based on the measured KPI and/or the estimated KPI number. In various embodiments, the measured KPI is measured by the sensors 35, 40, and/or 95. In some embodiments, the estimated KPI number is determined by the KPI estimation module 125. In some implementations, the at least one second fuel temperature setpoint is based on an engine protection setpoint. In various embodiments, the engine protection setpoint is determined or set by the OEM system 12, the first fuel control system 14, or the second fuel control system 16.

Figure 8:
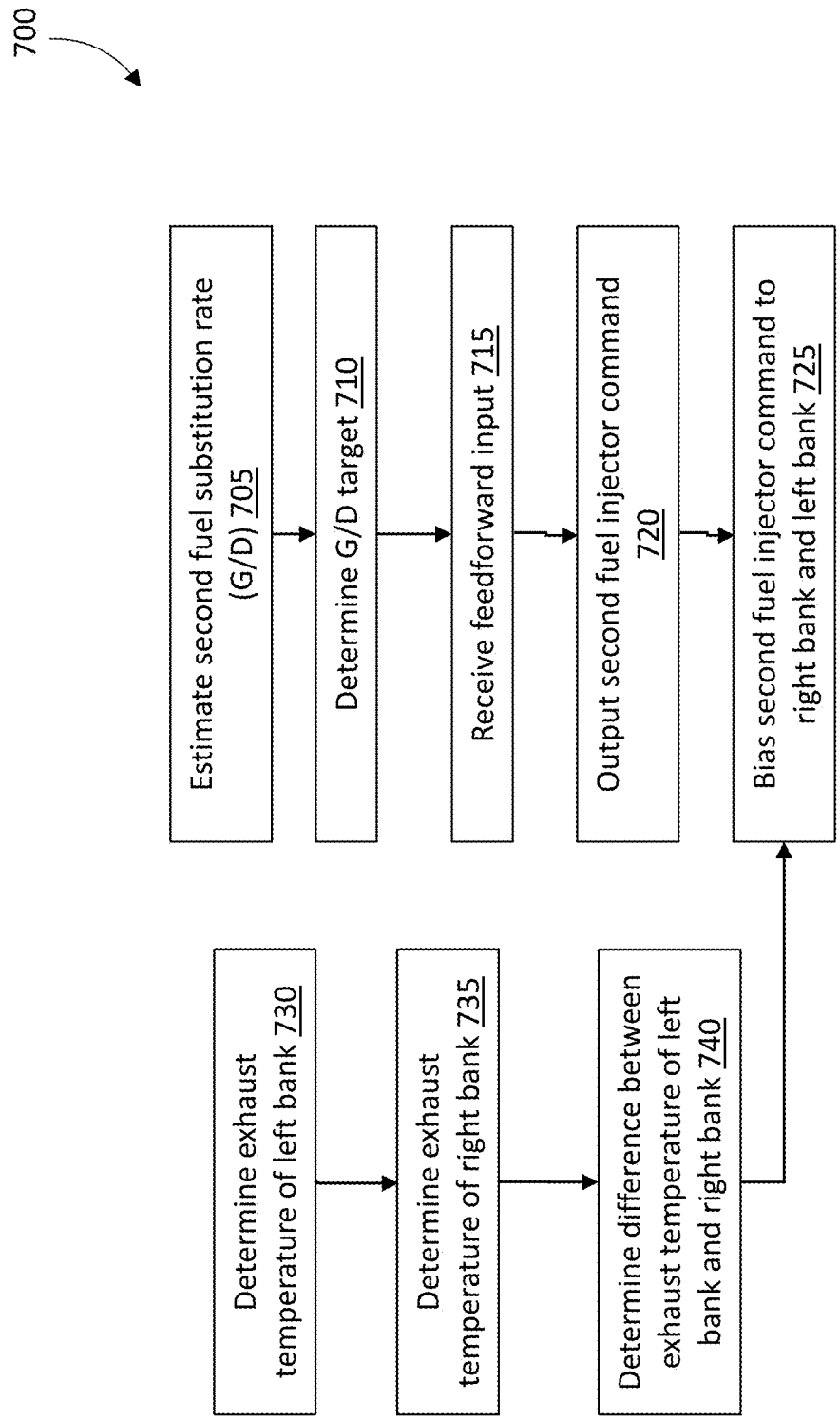
FIG. 8 is a flow diagram illustrating a method carried out by the control system of FIG. 2, according to at least one embodiment.

FIG. 8 shows a method 700 carried out by the dual fuel engine system 10. In various embodiments, the dual fuel engine system 10 includes at least one PID controller coupled to the internal combustion engine 20 and the second fuel injector 28. In an operation 705, the control system 11 determines a G/D estimate. In various embodiments, the G/D estimate is determined from the LHV and G/D estimation module 120. The control system 11 then determines a G/D target in an operation 710. In various embodiments, the control system 11 determines the G/D target in the operation 710 by carrying out one or more operations similar or equivalent to the operation 520 in the method 500. In an operation 715, the at least one PID controller is configured to receive a feedforward input in addition to the G/D estimate and the G/D target. In various embodiments, the feedforward input is based on a look-up table, which can be determined or referenced from the first fuel ECM and torque fueling calculations module 45, the first fuel air handling, aftertreatment and fuel system reference determination and control module 60, and/or the indicated engine power and second fuel power estimation module 115.

In some embodiments, the G/D target is determined from the LHV and G/D estimation module 120. In an operation 720, the at least one PID controller is configured to output at least one second fuel injector command. In an operation 725, the at least one PID controller then biases the at least one second fuel injector command to each of the left bank 30 and the right bank 31. In various embodiments, the at least one PID controller biases the at least one second fuel injector command to each of the left bank 30 and the right bank 31 based on the difference between each of the left bank exhaust temperature (determined in the operation 730) and the right bank exhaust temperature (determined in the operation 735). In various embodiments, the exhaust temperature difference is determined in an operation 740. In some embodiments, the at least one PID controller includes a first PID controller and a second PID controller. For example, the first PID controller can be configured to receive the feedforward input, the G/D estimate, and the G/D target (i.e., the PID controller 150), and the second PID controller can be configured to bias the at least one second fuel injector command to each of the left bank 30 and the right bank 31 (i.e., the bank balancing PID 155).

In some embodiments, the dual fuel engine system 10 includes an aftertreatment system (i.e., controlled by the aftertreatment control system 85) operably coupled to the internal combustion engine 20, a second fuel injection system that includes the at least one second fuel injector 28 (i.e., controlled by the second fuel injector control module 110), and an air handling system (i.e., controlled by the air handling control system 80) operably coupled to the internal combustion engine 20. In some embodiments, the aftertreatment system is a selective catalytic reduction (SCR) and oxidation catalysts (OC) system. In some embodiments, the second fuel injection system is configured to independently control second fuel injection (i.e., via the at least one second fuel injector 28) on each of the left bank 30 and the right bank 31. In other embodiments, the air handling system is configured to control air flow through the internal combustion engine 20. In some embodiments, the air handling system controls the air flow independently from an operating condition of the internal combustion engine 20. In other embodiments, the air flow is based on a predetermined value obtained from a look-up table. In various embodiments, the look-up table is determined from or corresponds to the database 75 in the module 60). In various embodiments, the predetermined value is associated with a target temperature in at least one location of the aftertreatment system.

Figure 9:
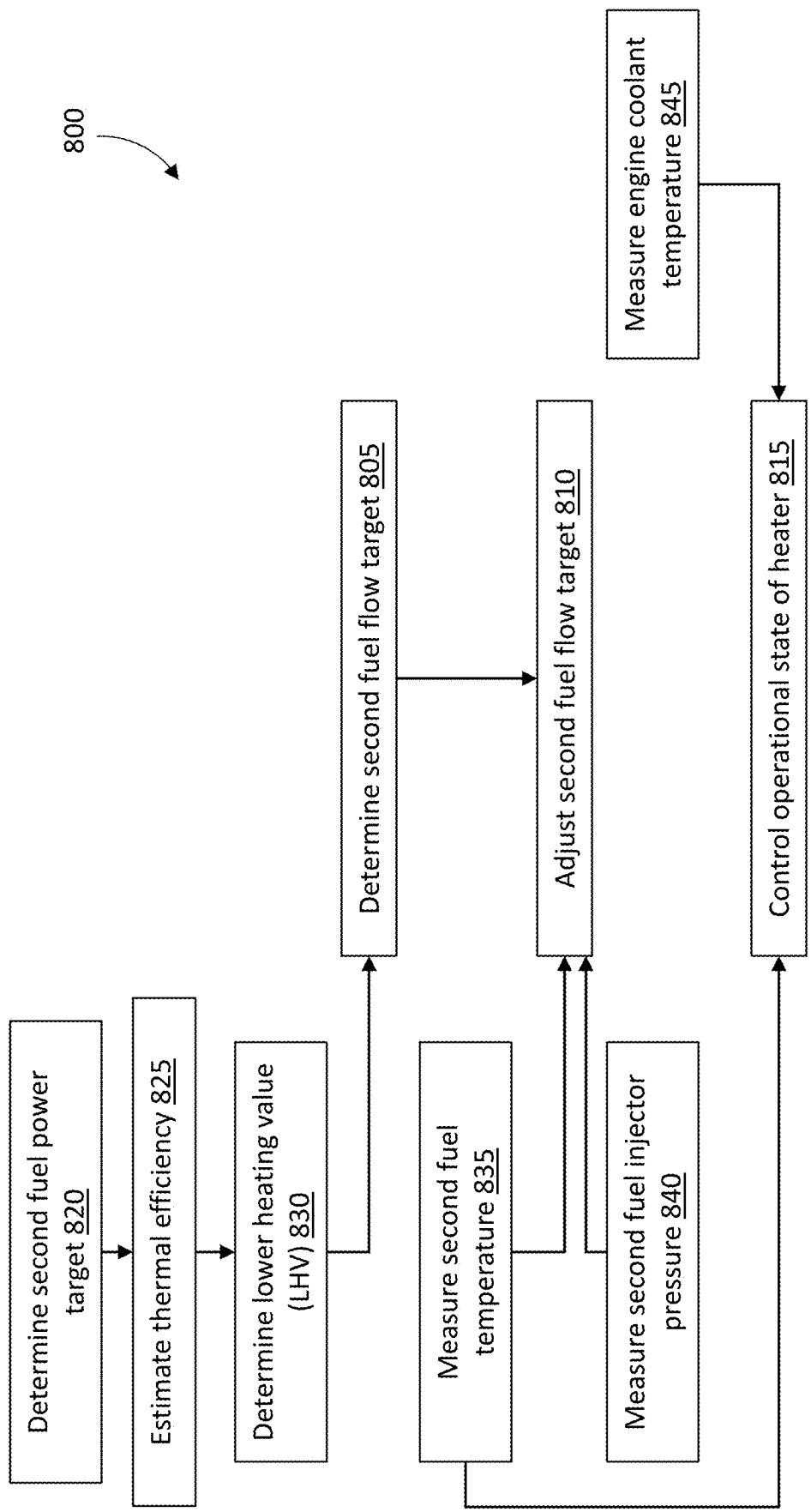
FIG. 9 is a flow diagram illustrating a method carried out by the control system of FIG. 2, according to at least one embodiment.

In various embodiments, the dual fuel engine system 10 includes one or more heaters operably coupled to the at least one second fuel injector 28 and the internal combustion engine 20. The at least one heater is configured to adjust a temperature of (i.e., heat) the second fuel flowing within the internal combustion engine 20. FIG. 9 illustrates a method 800 for controlling an operational state of the heater, which is coupled to the internal combustion engine 20. In an operation 805, the control system 11 is configured to determine a second fuel flow target. For example, the control system 11 is configured to determine a second fuel flow target, via one or more operations that are similar or equivalent to the operation 605. In various implementations, the second fuel flow target determined in the operation 805 can be based on one or more of a second fuel power target, an estimated thermal efficiency, and an LHV. For example, the second fuel flow target can be based on a second fuel power target determined in an operation 820, an estimated thermal efficiency of the internal combustion engine 20 determined in an operation 825, and an LHV determined in an operation 830. The control system 11 can adjust the second fuel flow target in an operation 810 based on at least one of a measured second fuel temperature or a measured second fuel injector pressure. For example, the control system 11 is configured to adjust the second fuel flow target in an operation 810 based on at least one of a measured second fuel temperature determined in an operation 835 or a measured second fuel injector pressure determined in an operation 840. In various implementations, the measured second fuel temperature determined in the operation 835 is determined by the control system 11 by carrying out one or more operations similar or equivalent to the operation 640. In some embodiments, the measured second fuel temperature is determined via the sensors 35, 40, and/or 95. In various embodiments, the measured second fuel injector pressure determined in the operation 840 is determined by the control system 11 by carrying out one or more operations similar or equivalent to the operation 645. In some embodiments, the measured second fuel injector pressure is determined via the sensors 35, 40, and/95. The control system 11 can then control an operational state of the heater 32 based on at least one of the measured second fuel temperature or a measured engine coolant temperature. In some embodiments, at least one of the measured second fuel temperature or the measured engine coolant temperature is determined via the sensors 35, 40, and/or 95.

In some embodiments, the control system 11 is configured to perform an on/off control of the heater 32 responsive to a determination made regarding the measured second fuel temperature relative to one or more threshold temperatures. For example, the control system 11 is configured to control operation of the heater 32 in response to a determination that the measured second fuel temperature is less than a first threshold temperature for a first period. In particular, in some embodiments, the control system 11 is configured to operate the heater 32 (i.e., to turn on) in response to a determination that the measured second fuel temperature (determined in the operation 835) is less than a first threshold temperature for a first period. In various embodiments, the first threshold temperature is set by the OEM system 12, the first fuel control system 14, or the second fuel control system 16. In other embodiments, the control system 11 is configured to control operation of the heater 32 in response to a determination that the measured second fuel temperature is greater than a second threshold temperature for a second period. For example, the control system 11 is configured to operate the heater 32 (i.e., to turn off) in response to a determination that the measured second fuel temperature (determined in the operation 835) is greater than a second threshold temperature for a second period. In various embodiments, the second threshold temperature is set by the OEM system 12, the first fuel control system 14, or the second fuel control system 16.

Depending on one or more attributes of the dual fuel engine system 10, one or more injectors configured to provide fuel to the internal combustion engine can exhibit at least one altered state. For example, the one or more attributes can include, but are not limited to, the age of the dual fuel engine system 10 and/or the use application of the dual fuel engine system 10. The altered state can manifest as, for example, degradation of one or more components. The altered state can alternatively or additionally manifest as altered performance, e.g., with respect to drifting of the injector (e.g., drifting upward or drifting downward to inject more or less fuel, respectively). Accordingly, in some embodiments, depending on the age and use application of the dual fuel engine system 10, injectors configured to provide an amount of the first fuel (or second fuel) to the internal combustion engine 20 can degrade or drift with time. The altered state can affect accuracy of one or more of the aforementioned fuel-related estimates. For example, the altered state can impair the accuracy of the first fuel power estimate and/or an indicated first fuel power estimate (e.g., as determined in the operation 420). In some embodiments, the indicated first fuel power can be estimated (e.g., by the control system 11) from one or more reference repositories. The one or more reference repositories can be, e.g., one or more look-up tables, or one or more databases, etc. The one or more reference repositories can be stored, e.g., in any one or more of a memory within the controller 18, a memory within the OEM system 12, a memory in the first fuel control system 14, or a memory within the second fuel control system 16.

Figure 10:
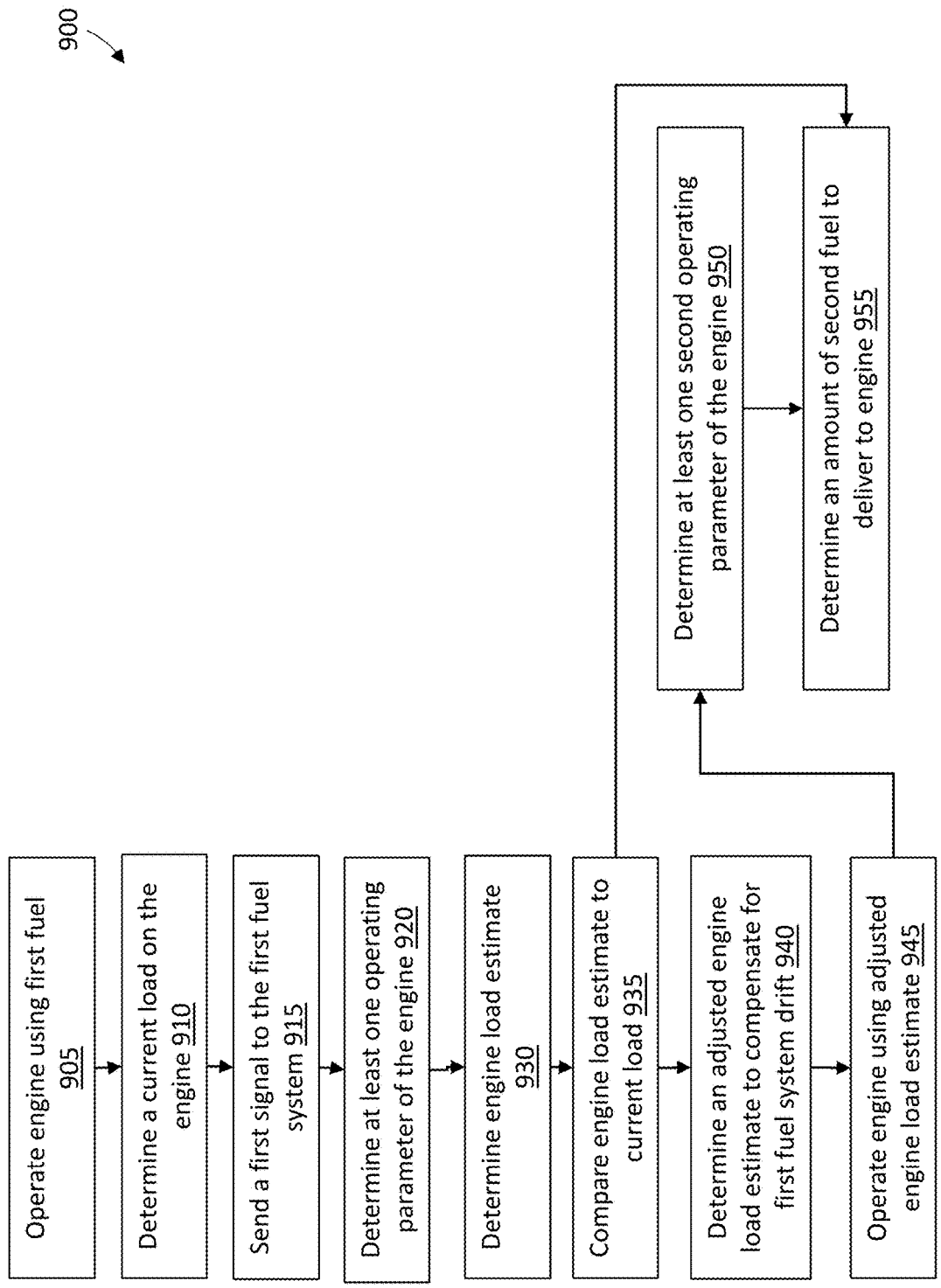
FIG. 10 is a flow diagram illustrating a method carried out by the control system of FIG. 2, according to at least one embodiment.

In various embodiments, the control system 11 can be configured to determine a drift amount corresponding to at least one of an injector for the first fuel (i.e., first fuel injector) within the first fuel control system 14, or an injector for the second fuel (i.e., second fuel injector) within the second fuel control system 16. FIG. 10 illustrates a method 900, which can be carried out by the control system 11 to determine a drift amount corresponding to the first fuel injector or the second fuel injector.

In an operation 905, the control system 11 can operate the engine 20 in mode using only the first fuel. While operating the engine 20 using the first fuel, the control system 11 can be configured to determine a current load on the engine 20 in an operation 910. The control system 11 can then send at least one first signal to the first fuel control system 14 in an operation 915. The first signal can cause the first fuel control system 14 to deliver an amount of the first fuel to the engine 20. In various embodiments, the first signal can include an electrical signal, a hydraulic parameter, a mechanical adjustment, or any other suitable signal known in the art.

After the control system 11 has sent the first signal and the first fuel control system 14 has delivered an amount of the first fuel to the engine 20, the control system 11 can be configured to determine at least one first operating parameter associated with the engine 20 in an operation 920. In various embodiments, the at least one first operating parameter can include an engine speed, a coolant temperature, an oil temperature, a coolant pressure, an oil pressure, an intake manifold pressure, an intake manifold temperature, an exhaust manifold temperature, an exhaust manifold pressure, an injection timing, and/or an injection pressure.

Based on the first signal (i.e., the amount of the first fuel delivered), the current load measured in the operation 910, and/or the at least one operating parameter determined in the operation 920, the control system 11 can be configured to determine an engine load estimate associated with the engine 20 in an operation 930. In various embodiments, the engine load estimate can be an indicated engine load. In an operation 935, the control system 11 can be configured to compare the engine load estimate determined in the operation 930 with the current load measured in the operation 910.

Based on the comparison between the current load and the engine load estimate, the control system 11 can be configured to determine an adjusted engine load estimate in an operation 940, where the adjusted engine load estimate corresponds to a drift amount of the first fuel system 14. Accordingly, the adjusted engine load estimate determined in the operation 940 compensates for drift within the first fuel system 14. For example, the adjusted engine load estimate compensates for drift of at least one first fuel injector within the first fuel system 14. Once the control system 11 has determined the adjusted engine load estimate, the control system 11 can operate the engine 20 and dual fuel engine system 10 using the adjusted engine load estimate in an operation 945. By operating the dual fuel engine system 10 using the adjusted engine load estimate, the control system 11 can provide appropriate amounts of the first fuel (and/or second fuel) in future engine cycles to account for drift in the first fuel control system 14 and reduce risk of degradation to the dual fuel engine system 10.

In various embodiments, the control system 11 can be configured to determine appropriate fueling amounts of the second fuel based on the determine drift amount corresponding to the first fuel control system 14. As shown in FIG. 10, after operating the engine 20 using the adjusted engine load estimate determined in the operation 945, the control system 11 can be configured to determine at least one second operating parameter associated with the engine 20 in an operation 950. In various embodiments the at least one second operating parameter can include an engine speed, a coolant temperature, an oil temperature, a coolant pressure, an oil pressure, an intake manifold pressure, an intake manifold temperature, an exhaust manifold temperature, an exhaust manifold pressure, an injection timing, and/or an injection pressure. In various embodiments, the control system 11 can determine an amount of the second fuel to deliver to the engine 20 in an operation 955 based on the at least one second operating parameter determined in the operation 950 and/or the comparison between the engine load estimate and the current load carried out in the operation 935.

In various embodiments, the control system 11 is configured to operate the engine 20 (and thus the dual fuel engine system 10) using the adjusted engine load estimate in the operation 945 for a predetermined number of cycles or a predetermined period of time. Accordingly, in some embodiments, the control system 11 is configured to determine the at least one second operating parameter in the operation 950 during the predetermined number of cycles or the predetermined period of time. In various embodiments, the control system 11 is configured to determine engine load estimate based on a net engine load. In some embodiments, the control system 11 is configured to determine the net engine load by estimating a gross engine load and subtracting a parasitic load on the engine 20. In various embodiments, the control system 11 is configured to determine the parasitic load based on a load corresponding to one or more auxiliary components within the dual fuel engine system 10. For example, in some embodiments, the parasitic load on the engine 20 can correspond to an operational load of at least one cooling fan. Thus, in various embodiments, determining the parasitic load includes determining a load corresponding to the at least one cooling fan.

It should be noted that method 900 is described above in the context of the control system 11 carrying operations relating to the first fuel followed by operations relating to the second fuel, the control system 11 can be configured to carry out the method 900 by first carrying out operations related to the second fuel followed by operations relating to the first fuel. For example, in some implementations, the control system 11 can be configured to first operate the engine 20 using the second fuel and determine an adjusted engine load estimate based on the second fuel. The control system 11 can then subsequently carry out the method 900 to determine an amount of the first fuel to deliver to the engine 20 based on an adjusted engine load estimate determined to compensate for drift in the second fuel control system 16.

In various embodiments, a method of controlling the dual fuel engine 20 configured to receive a first fuel and a second fuel can include operating the engine 20 using the first fuel. The method can also include measuring, by a controller (e.g., controller 18), a current load of the engine 20. The method can further include sending, by the controller (e.g., controller 18), a first signal to the first fuel system 14 to deliver an amount of the first fuel to the engine 20. The method can also include determining, by the controller (e.g., controller 18), at least one first operating parameter associated with the engine 20. The method can further include determining, by the controller (e.g., controller 18), an engine load estimate based on the first signal and the at least one first operating parameter. The method can include comparing, by the controller (e.g., controller 18), the engine load estimate to the measured load and, based on the comparison, determining, by the controller, an adjusted engine load estimate to compensate for a drift in the first fuel system 14.

In other embodiments, the dual fuel engine system 10 can include the engine 20 configured to receive a first fuel and a second fuel; the first fuel system 14 for delivering the first fuel to the engine; the second fuel system 16 for delivering the second fuel to the engine 20; and a controller 18 operably coupled to each of the engine 20, the first fuel system 14, and the second fuel system 16. The controller 18 can be configured to transmit a first signal to one of the first fuel system 14 or the second fuel system 16 to cause the first fuel system 14 or the second fuel system 16 to deliver an amount of the respective first fuel or the second fuel. The controller 18 can be configured to measure a current engine load. The controller 18 can be further configured to determine at least one first operating parameter of the engine 20 and determine an engine load estimate based on the at least one first operating parameter, and the amount of the first fuel or the second fuel. The controller 18 can be configured to compare the engine load estimate to the current engine load and, based on the comparison, determine an adjusted engine load estimate to compensate for drift in one of the first fuel or the second fuel. In various embodiments, the controller 18 can be further configured to determine an amount of the other of the first fuel or the second fuel to deliver to the engine 20. In some embodiments, the controller 18 is configured to determine the amount of the other of the first fuel or the second fuel based on at least one second operating parameter. In some embodiments, the dual fuel engine system 10 includes at least one generator configured to be driven by the engine 20, where the current engine load can be based on a current and/or voltage corresponding to the generator.

As described above, the control system 11 can be configured to determine a drift amount corresponding to the first fuel control system 14 or the second fuel control system 16. In other embodiments, the control system 11 can be configured to control for drift within the first fuel control system 14 and/or the second fuel control system 16 by determining a fuel substitution rate, G/D, within the dual fuel engine system 10. Accordingly, in some embodiments, the control system 11 can be configured to determine the drift amount by determining a substitution rate G/D. For example, if one or more first fuel injectors within the dual fuel engine system 10 (e.g., within the first fuel control system 14) drifts downward, the estimated indicated first fuel power can be higher than an actual indicated first fuel power. Such a discrepancy can lead to an underestimation of the G/D. If the G/D is underestimated, the internal combustion engine 20 can run at a higher G/D than desired. Operating at a higher G/D exceeding a given threshold can lead to one or more undesired operational states. For example, the undesired operational states can include one or more of engine knock, elevated component temperatures (e.g., elevated first fuel injector tip temperature), and/or other detrimental effects that can impact aspects of the dual fuel engine system 10.

Such aspects can include overall performance, emissions levels, reliability, and/or durability of the dual fuel engine system 10.

Accordingly, in some embodiments, at least one of (i) the indicated engine power or second fuel estimation module 115 or (ii) the second fuel LHV and G/D estimation module 120 is configured to determine the G/D rate for the second fuel based on one or more attributes of the dual fuel engine system 10. In particular, the at least one of (i) the indicated engine power or second fuel estimation module 115 or (ii) the second fuel LHV and G/D estimation module 120 is configured to determine the G/D rate for the second fuel based on an age of one or more injectors configured to provide an amount of the first fuel within the internal combustion engine 20. In various embodiments, the module 115 and/or the module 120 is configured to determine the G/D rate for the second fuel based on a virtual sensor. In some embodiments, the virtual sensor is configured to estimate the G/D based on the total indicated engine power and an indicated first fuel power. For example, the virtual sensor can estimate the G/D. For example, the virtual sensor can estimate the G/D by dividing a difference between the indicated first fuel power and the total indicated power by the total indicated power, and multiplying to obtain the G/D. In particular, the virtual sensor can divide the difference between the indicated first fuel power and the total indicated power by the total indicated power and multiply the result by 100% to obtain the G/D as a percent substitution of the first fuel with the second fuel. Such a percent substitution (a percent of fuel substitution) can indicate the split between the first fuel and the second fuel. In this manner, a fuel substitution rate can be determined for the dual fuel engine system 10. In various embodiments, the virtual sensor is included within or is in operable communication with the control system 11. For example, the virtual sensor can estimate the G/D based on the total indicated engine power and the indicated first fuel power determined in the operation 420.

Figure 11:
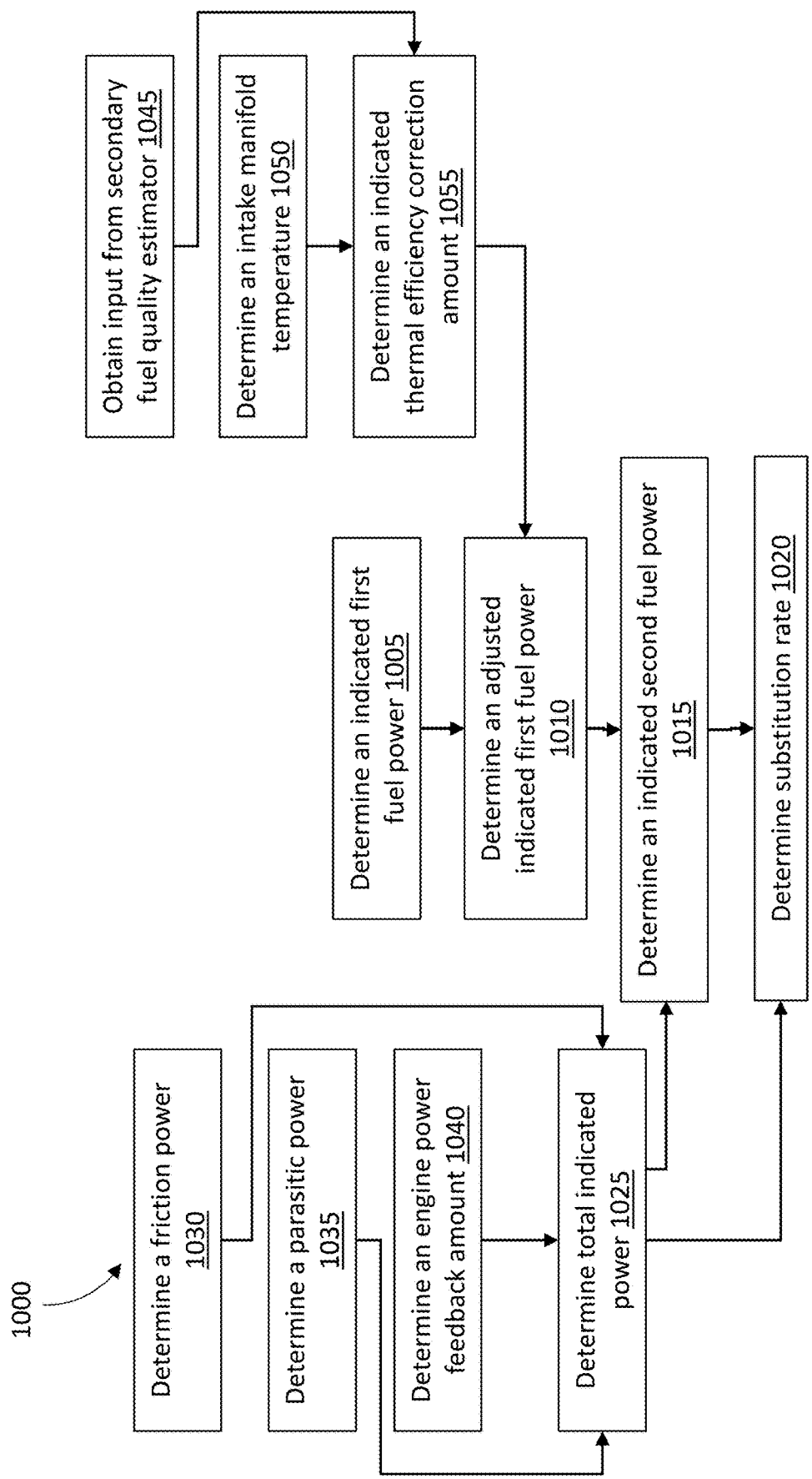
FIG. 11 is a flow diagram illustrating a method carried out by the control system of FIG. 2, according to at least one embodiment.

FIG. 11 is a flow diagram illustrating a method 1000 carried out by the control system 11 for estimating the G/D within the dual fuel engine system 10. In particular, the method 1000 can be carried out for estimating the G/D using the indicated first fuel power, determined in an operation 1005. As shown in FIG. 11, the control system 11 can be configured to determine the friction power or load on the engine 20 in an operation 1030, and determine a parasitic power or load on the engine 20 in an operation 1035. In various embodiments, the friction power can correspond to a braking power of the dual fuel engine system 10. In various embodiments, the parasitic load can correspond to a load of one or more auxiliary components within the dual fuel engine system 10 (e.g., a cooling fan).

The control system 11 can also be configured to determine an engine power feedback amount associated with the engine 20 in an operation 1040. Using the friction power, the parasitic load, and/or the engine power feedback amount, the control system 11 can determine a total indicated power amount or total indicated load on the engine 20 in an operation 1025. In various embodiments, the total indicated load can be a measured current load on the engine 20. In other embodiments, the total indicated load can be an engine load estimate determined by the control system 11.

To determine the G/D, the control system 11 can be configured to determine indicated power amounts corresponding to each of the first fuel and the second fuel. Accordingly, the control system 11 can be configured to determine an indicated first fuel power in an operation 1005.

In various embodiments, the indicated first fuel power can be affected by one or more operating parameters within the dual fuel engine system 10. Accordingly, as shown in FIG. 11, the control system 11 can be configured to determine an adjusted first fuel power amount in an operation 1010. The adjusted first fuel power amount can be based on an indicated thermal efficiency correction amount determined by the control system 11 in an operation 1055. As shown, the thermal efficiency correction amount can be determined by the control system 11 based on at least one of an intake manifold temperature, which can be determined in an operation 1050, or an input from a fuel quality estimator, which can be obtained in an operation 1045. In various embodiments, the intake manifold temperature can be a maximum temperature. In other embodiments, the intake manifold temperature can be an average temperature.

As shown in FIG. 11, in various embodiments, the control system 11 can be configured to determine an indicated second fuel power in an operation 1015. In various embodiments, the indicated second fuel power can be determined by the control system 11 based on the adjusted indicated first fuel power determined in the operation 1010 and/or the total indicated power determined in the operation 1025. Using the indicated second fuel power and the total indicated power, the control system 11 can determine a compensated substitution rate G/D in an operation 1020 that accounts for drift in at least one of the first fuel control system 14 or the second fuel control system 16.

Figure 12:
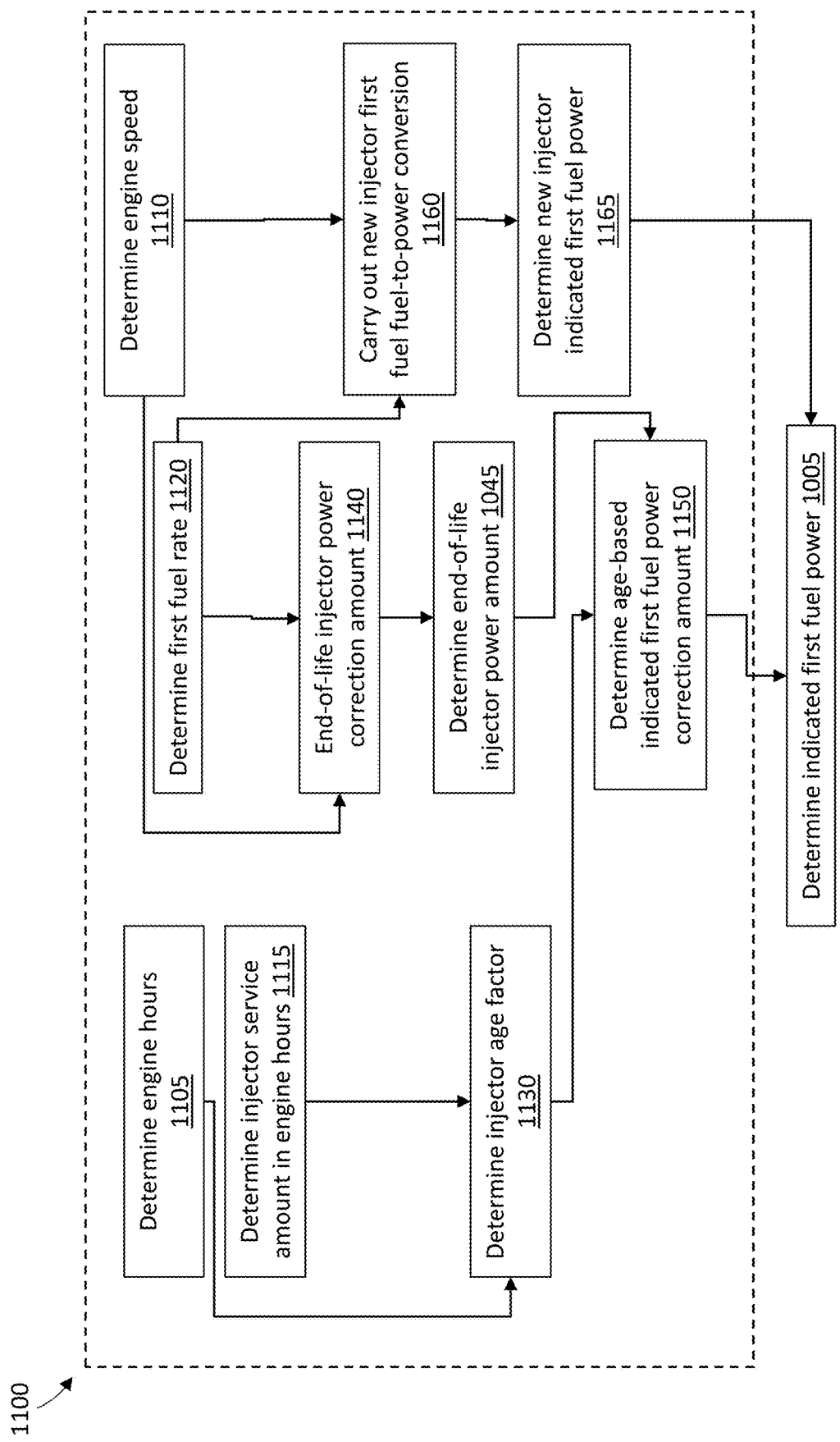
FIG. 12 is a flow diagram illustrating a method carried out by the control system of FIG. 2, according to at least one embodiment.

In various embodiments, the control system 11 can be configured to determine the indicated first fuel power by compensating for drift and/or age within the first fuel control system 14. After compensating for an age of one or more first fuel injectors, the control system 11 can then determine a compensated G/D. As shown in FIG. 10, the control system 11 is configured to determine a total duration of operation of the internal combustion engine 20 and one or more of fuel injectors. FIG. 12 illustrates a method 1100 carried out by the control system 11 for determining the indicated first fuel power 1005 by accounting for drift of at least one injector within the first fuel control system 14. As shown in FIG. 11, the control system 11 can be configured to determine an engine operating time in engine hours in an operation 1105. The total duration of operation can be, e.g., total number of hours of operation corresponding to the internal combustion engine 20.

The control system 11 is further configured to determine a total duration of operation (e.g., total number of hours of operation) corresponding to the one or more first fuel injectors ("injector age") in an operation 1115. Using the duration of operation corresponding to each of the internal combustion engine 20 and the one or more first fuel injectors as inputs, the control system 11 can determine at least one injector age factor in an operation 1130. In various embodiments, the control system 11 is configured to determine at least one injector age factor from at least one first reference repository, such as one or more injector age reference repositories (e.g., one or more databases, one or more look-up tables, etc.).

Based on the determined injector age, the control system 11 is configured to determine a power correction amount associated with the one or more first fuel injectors in an operation 1150. As shown in FIG. 11, the control system 11 is configured to determine an engine speed and a first fuel rate (e.g., from the OEM 12) in operations 1110 and 1120, respectively. Using the engine speed and the first fuel rate, the control system 11 is configured to determine a first injector indicated first fuel power in the operation 1165. In various embodiments, the control system 11 is configured to determine the first injector indicated first fuel power amount by carrying out a fuel-to-power conversion in an operation 1160. For example, the control system 11 can be configured to determine the first injector indicated first fuel power amount from at least one second reference repository, such as one or more first fuel injector fuel-to-power reference repositories (e.g., one or more databases, one or more look-up tables, etc.). In some embodiments, the first injector indicated first fuel power amount corresponds to a power amount associated with a nominal injector. The nominal injector can correspond to a substantially unused injector having no or minimal hours in service (e.g., at the start of its operational life).

The control system 11 can be further configured to determine a second injector indicated first fuel power amount or an injector first fuel power correction amount ("End-of-life injector power correction amount") in an operation 1140. In various embodiments, the control system 11 can be configured to determine the end-of-life (EOL) power correction amount from at least one third reference repository. In some embodiments, the third reference repository can include one or more end-of-life (EOL) injector power correction tables corresponding to the one or more first fuel injectors within the dual fuel engine system 10. The control system 11 can use the EOL injector power correction amount to determine an EOL injector power amount in an operation 1045.

In some embodiments, in addition to determining the first injector indicated first fuel power amount and the injector first fuel power correction amount, the control system 11 can be further configured to determine an age-fraction parameter associated with the one or more first fuel injector. In some embodiments, the age-fraction parameter is scaled based on the age of the one or more first fuel injectors. For example, the age-fraction parameter can be directly or indirectly proportional to the age of the at least one first fuel injector. Accordingly, as shown in FIG. 11, the control system 11 can be configured to determine an age-based indicated first fuel power correction amount based on the first injector indicated first fuel power amount (determined in the operation 1165), the injector first fuel power correction amount ("age factor") (determined in the operation 1130), and the age-fraction parameter.

In some embodiments, the control system 11 can determine the age-based indicated first fuel power correction amount in the operation 1150 by calculating one or more of a product of the first injector indicated first fuel power amount, the injector first fuel power correction amount, and the age-fraction parameter. For example, the control system 11 can determine the age-based indicated first fuel power correction amount by calculating each of the product of the first injector indicated first fuel power amount, the injector first fuel power correction amount, and the age-fraction parameter.

Finally, as shown in FIG. 12, the control system 11 can be configured to determine the indicated first fuel power amount in the operation 1005 using the age-based indicated first fuel power correction amount (determined in the operation 1150) and the first injector indicated first fuel power amount (determined in the operation 1165). In various embodiments, determining the indicated first fuel power amount in the operation 1005 can include subtracting the age-based indicated first fuel power correction amount (determined in the operation 1150) from the first injector indicated first fuel power amount (determined in the operation 1165). As described previously in relation to FIG. 11, the control system 11 can then determine the G/D using the adjusted indicated first fuel power amount, an indicated second fuel power, the total indicated engine power, and a thermal efficiency amount.

Figure 13:
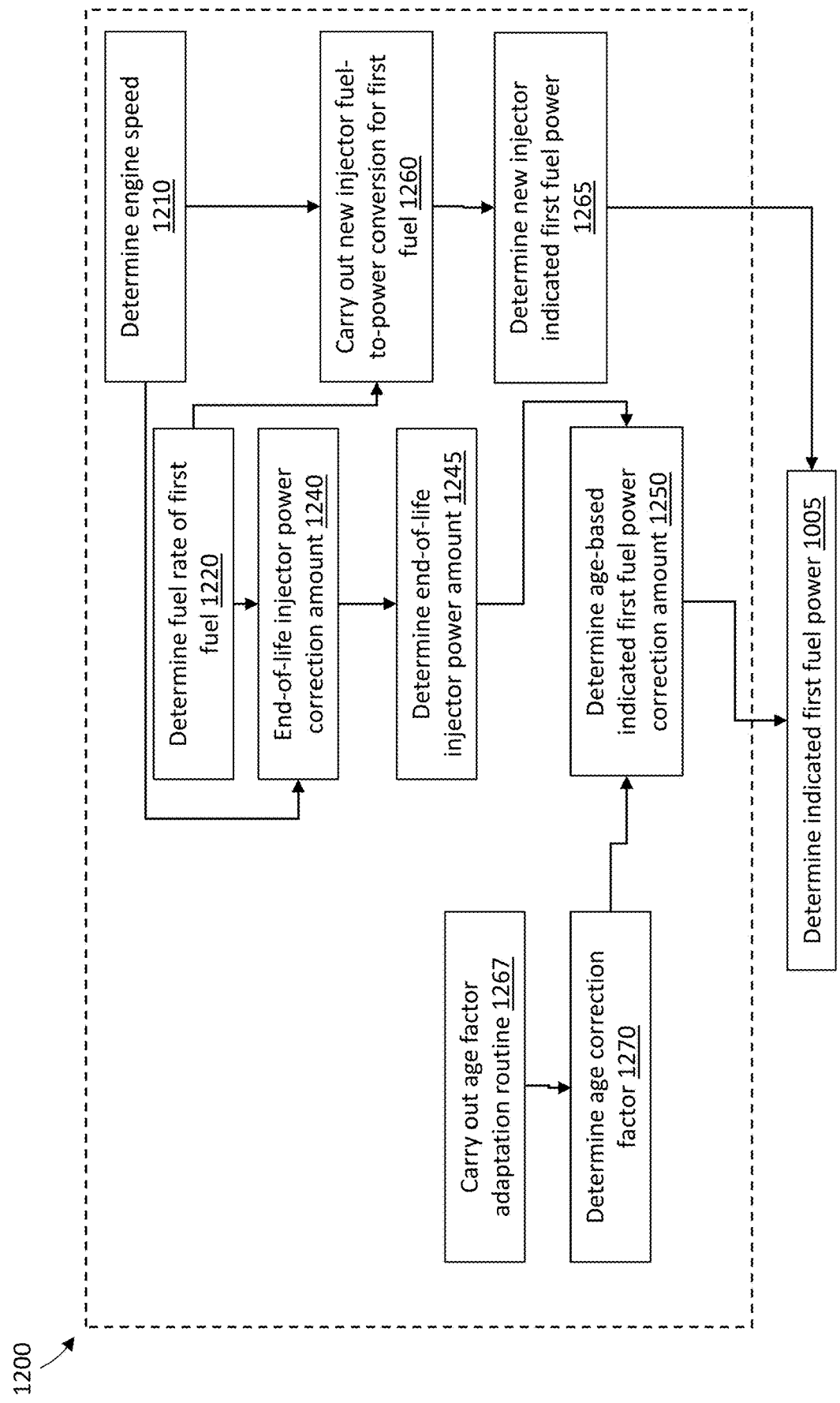
FIG. 13 is a flow diagram illustrating a method carried out by the control system of FIG. 2, according to at least one embodiment.

In other embodiments, such as shown in FIG. 13, the control system 11 can calculate the at least one injector age factor using at least one age factor adaptation algorithm carrying out a method 1200. In various embodiments, the operations 1210-1265 of the method 1200 are similar or equivalent to the respective operations 1110-1165 of the method 1100. As shown in FIG. 13, in various embodiments, the control system 11 can carry out the at least one age factor adaptation algorithm to determine a calibration amount ("correction factor") in an operation 1267. In various embodiments, the control system 11 can carry out the operation 1267 by determining an upper calibration amount and/or a lower calibration amount. For example, the calibration amount can be a lower bound calibration amount (e.g., zero), which can correspond to no or a minimum age-based indicated first fuel power correction amount. For example, in a case where the one or more first fuel injectors are substantially unused (i.e., having no or below a threshold number of hours in service), the lower bound calibration amount is zero. A lower-bound calibration amount of zero or can correspond to an age-based indicated first fuel power correction amount of zero, i.e., no age-based first fuel power correction amount. The control system 11 can be further configured to determine an upper bound calibration amount, which can correspond to an EOL or maximum age-based indicated first fuel power correction amount. The control system 11 can be configured to adjust the age-based indicated first fuel power correction amount by interpolating between the lower bound calibration amount and the upper bound calibration amount in an operation 1270 to determine an age correction factor.

In various embodiments, the control system 11 can be configured to interpolate between the lower bound calibration amount and the upper bound calibration amount. The interpolation can be performed based on a rationality check operation carried out when the dual engine system 10 is operating in a single fueling mode, using the first fuel. In some embodiments, the rationality check operation can be carried out by the control system 11 in a first fuel-only fueling mode prior to the dual fuel engine system 10 entering dual fuel mode. For example, the rationality check operation can be performed immediately before entering the dual fuel mode from the first fuel-only fueling mode. The control system 11 can be configured to compare the total indicated power amount to the indicated first fuel power during the rationality check operation. For example, the control system 11 can determine a difference between the total indicated power amount and the indicated first fuel power. In some embodiments, when the control system 11 determines the difference between the total indicated power amount and the indicated first fuel power is more than a first threshold amount less than the indicated first fuel power, the control system 11 can determine that the at least one first fuel injector has drifted downward. In other embodiments, when the control system 11 determines the difference between the total indicated power amount and the indicated first fuel power is more than a second threshold amount more than the indicated first fuel power, the control system 11 can determine that the at least one first fuel injector is substantially unused or newly installed within the dual fuel engine system 10 (i.e., having a minimal age or minimal number of hours in service).

The control system 11 can be configured to perform one or more incremental operations after the rationality check operation. For example, the control system 11 can be configured to increment the injector first fuel power correction amount (i.e., determined in the operation 1250) toward the upper bound calibration amount when the difference between the total indicated power amount and the indicated first fuel power exceeds the first threshold. Conversely, the control system 11 can be configured to increment the injector first fuel power correction amount toward the lower bound calibration amount when the difference between the total indicated power amount and the indicated first fuel power exceeds the second threshold. In some embodiments, the difference between the total indicated power amount and the indicated first fuel power amount exceeding the second threshold can be indicative of the at least one first fuel injector being recently replaced during a service of the dual fuel engine system 10. In various embodiments, the control system 11 can be configured to carry out no adjustment to the injector first fuel power correction amount. For example, the control system 11 can determine not to increment the injector first fuel power correction amount toward either the upper bound calibration amount or the lower bound calibration amount.

In various embodiments, the control system 11 is configured to store the injector first fuel power correction amount ("age factor") in non-volatile memory such that the injector first fuel power correction amount is saved and available to be restored and/or reused across one or more cycles of the internal combustion engine 20. For example, in various embodiments, the injector first fuel power correction amount can be restored by the control system 11 during one or more key cycles (e.g., power-down cycles) of the internal combustion engine 20. In various embodiments, the injector first fuel power correction amount can be adjusted by the control system 11 based on a service of the dual fuel engine system 10. For example, in some embodiments, the control system 11 can be configured to reset the injector first fuel power correction amount to zero if the at least one first fuel injector is replaced. In other embodiments, the control system 11 can adjust the injector first fuel power correction amount to a higher value in a case when a dual fuel kit is installed on an engine (e.g., the engine 20) having an age exceeding a threshold. For example, the control system 11 can adjust the injector first fuel power correction amount to the higher value when the engine is a relatively aged engine. In various embodiments, the upper bound calibration amount is one and the lower bound calibration amount is zero.

Figure 14:
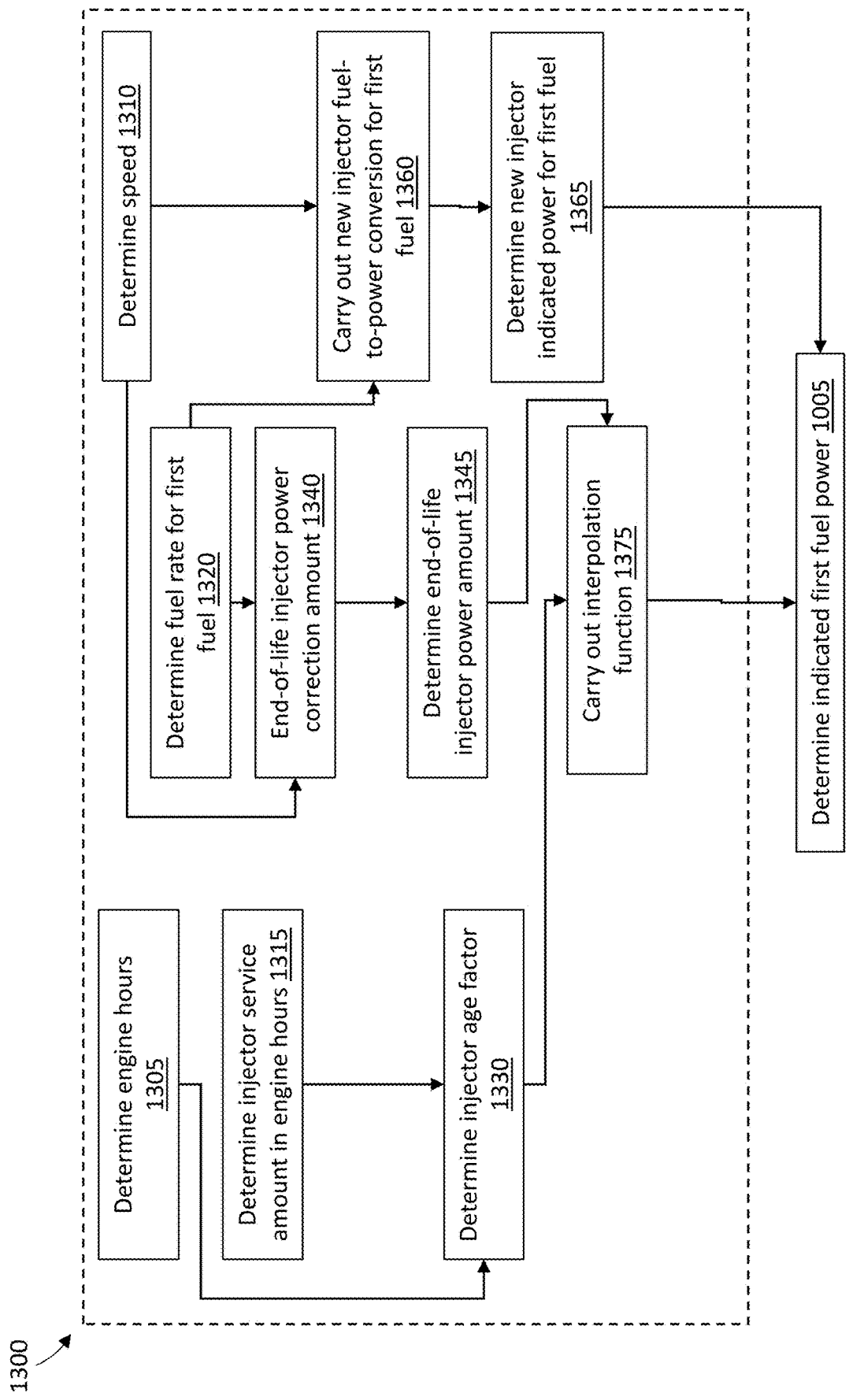
FIG. 14 is a flow diagram illustrating a method carried out by the control system of FIG. 2, according to at least one embodiment.

In various embodiments, the control system 11 is configured to determine the indicated first fuel power amount from the adjustment determination operation using one or more interpolation functions, as shown in FIG. 14, which illustrates a method 1300. In various embodiments, the operations 1305-1365 of the method 1300 are similar or equivalent to the respective operations 1105-1165 of the method 1100. As shown in FIG. 14, the adjustment determination operation carried out by the control system 11 (i.e., determining the indicated first fuel power) can include the execution of one or more interpolation functions in an operation 1375. In various embodiments, execution of the one or more interpolation functions can be based on the first injector indicated first fuel power amount (determined in the operation 1365), the second injector indicated first fuel power amount (determined in the 1345), and an interpolation factor. In various embodiments, the control system 11 can be configured to determine the interpolation factor based on the injector first fuel power correction amount ("age factor") determined in the operation 1130 and/or the age-fraction parameter. In various embodiments, the control system 11 can be configured to determine the interpolation factor by calculating a product of the injector first fuel power correction amount ("age factor") and the age-fraction parameter.

In various embodiments, the control system 11 can be configured to output an indicated first fuel power amount corresponding to the first injector indicated first fuel power amount (i.e., an indicated first fuel power amount corresponding to a new first fuel injector such as determined in the operation 1365) in a case when the interpolation factor has a first value. For example, the first value of the interpolation factor can be zero. Conversely, the control system 11 can be configured to output an indicated first fuel power amount corresponding to the second injector indicated first fuel power amount (i.e., an indicated first fuel power amount corresponding to an EOL first fuel injector such as determined in the operation 1345) in a case when the interpolation factor has a second value. For example, the second value of the interpolation factor can be one. Accordingly, when carrying out the method 1300, the control system 11 can carry out the one or more interpolation functions in the operation 1375 by interpolating between the first value and the second value to determine the indicated first fuel power amount in the operation 1005.

Figure 15:
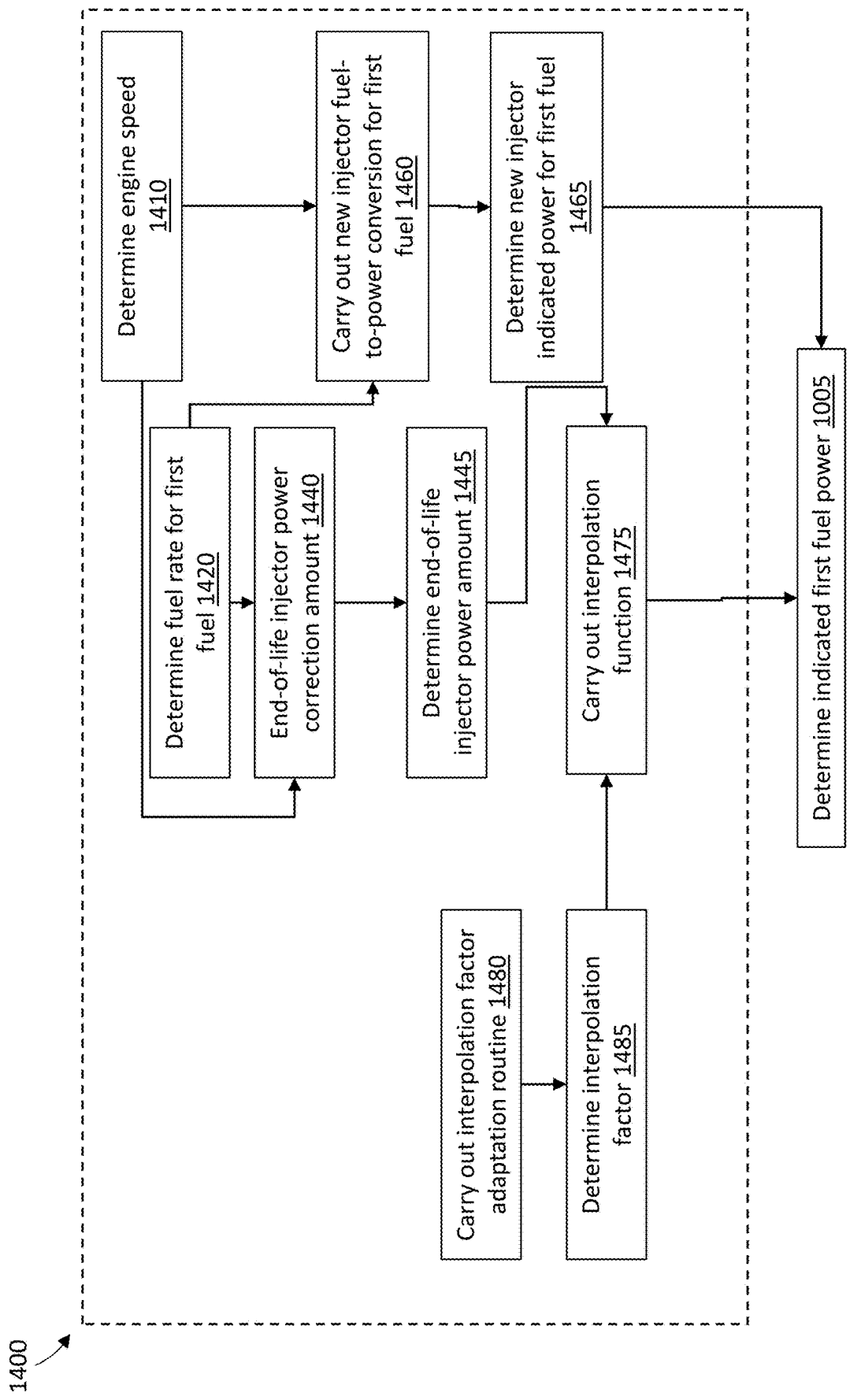
FIG. 15 is a flow diagram illustrating a method carried out by the control system of FIG. 2, according to at least one embodiment.

In yet other embodiments, such as shown in FIG. 15, the control system 11 can be configured to carry out a method 1400. In various embodiments, operation 1410-1475 of the method 1400 are similar or equivalent to the respective operations 1310-1375 of the method 1300. As shown in FIG. 15, the control system 11 can be configured to determine one or more interpolation factors in an operation 1485. For example, as shown in FIG. 15, the control system 11 can be configured to determine the one or more interpolation factors by carrying out one or more age factor adaptation algorithms in an operation 1480. In various embodiments, the one or more age factor adaptation algorithms in the operation 1480 can be similar or equivalent to the age factor adaptation algorithms carried out in the operation 1267.

In various embodiments, the control system 11 can be configured to implement one or more of the methods 900, 1000, 1100, 1200, 1300, or 1400 to compensate for drift within the first fuel control system 14 and/or the second fuel control system 16. For example, in some embodiments, the control system 11 can be configured to carry out one or more of the methods 1000, 1100, 1200, 1300, or 1400 prior to or after carrying out the method 900. In yet other embodiments, the control system 11 can be configured to carry out one or more of the methods 1000, 1100, 1200, 1300, or 1400 in parallel or in sequence with the method 900. For example, in some embodiments, determining the amount of the second fuel in the operation 950 can include carrying out any of the methods 1000, 1100, 1200, 1300, and/or 1400, or any one or more operations thereof. In yet other embodiments, the control system 11 can be configured to carry out one or more of the methods 1000, 1100, 1200, 1300, or 1400 (or one or more operations thereof) in carrying out the operations 930, 940, 945, 950, and/or 955.

Notwithstanding the embodiments described above in reference to FIGS. 1-15, various modifications and inclusions to those embodiments are contemplated and considered within the scope of the present disclosure.

The present technology may also include, but is not limited to, the features and combinations of features recited in the following lettered paragraphs, it being understood that the following paragraphs should not be interpreted as limiting the scope of the claims as appended hereto or mandating that all such features must necessarily be included in such A. A method of controlling a dual fuel engine configured to receive a first fuel and a second fuel, the method comprising:
operating the engine using the first fuel;
measuring, by a controller, a current load of the engine;
sending, by the controller, a first signal to a first fuel system to deliver an amount of the first fuel to the engine;
determining, by the controller, at least one first operating parameter associated with the engine;
determining, by the controller, an engine load estimate based on the first signal and the at least one first operating parameter;
comparing, by the controller, the engine load estimate to the measured current load;
and based on the comparison, determining, by the controller, an adjusted engine and load estimate to compensate for a drift in the first fuel system.

B. The method of paragraph A, further comprising:
determining, by the controller, an amount of a second fuel to deliver to the engine.

C. The method of paragraph B, wherein determining the amount of the second fuel to deliver to the engine is based on comparing the engine load estimate to the measured current load.

D The method of any of paragraph B or C, further comprising:
operating, by the controller, the engine using the adjusted engine load estimate for one of a predetermined number of cycles or a predetermined period of time;
wherein the amount of the second fuel is determined based on at least one second operating parameter determined during the predetermined number of cycles or the predetermined period of time.

E. The method of any one of the preceding paragraphs, further comprising determining, by the controller, a parasitic load on the engine.

F. The method of paragraph E, wherein determining the parasitic load on the engine comprises determining, by the controller, a load corresponding to at least one cooling fan.

G. The method of paragraph F, wherein determining the engine load estimate comprises determining, by the controller, a net engine load.

H. The method of paragraph G, wherein determining the net engine load comprises:
estimating, by the controller, a gross engine load; and
subtracting the parasitic load.

I. A dual fuel engine system comprising:
an engine configured to receive a first fuel and a second fuel;
a first fuel system for delivering the first fuel to the engine;
a second fuel system for delivering the second fuel to the engine;
a controller operably coupled to each of the engine, the first fuel system, and the second fuel system, the controller configured to:
transmit a first signal to one of the first fuel system or the second fuel system to cause the first fuel system or the second fuel system to deliver an amount of the respective first fuel or the second fuel;
measure a current engine load;
determine at least one first operating parameter of the engine;
determine an engine load estimate based the at least one first operating parameter and the amount of the first fuel or the second fuel;
compare the engine load estimate to the current engine load; and
based on the comparison, determine an adjusted engine load estimate to compensate for drift in one of the first fuel or the second fuel.

J. The dual fuel engine system of paragraph I, wherein the controller is further configured to determine an amount of the other of the first fuel or the second fuel to deliver to the engine.

K. The dual fuel engine system of paragraph J, wherein the controller is configured to determine the amount of the other of the first fuel or the second fuel based on at least one second operating parameter.

L. The dual fuel engine system of any one of paragraphs I to K, wherein the current engine load is based on at least one of an engine torque or an engine speed.

M. The dual fuel engine system of any one of paragraphs I to L, further comprising a generator driven by the engine, wherein the current engine load is based on a current and voltage corresponding to a generator.

N. The dual fuel engine system of any one of paragraphs I to M, wherein the at least one first operating parameter comprises at least one of an engine speed, a coolant temperature, an oil temperature, a coolant pressure, an oil pressure, an intake manifold pressure, an intake manifold temperature, an exhaust manifold temperature, an exhaust manifold pressure, an injection timing, or an injection pressure.

O. The dual fuel engine system of any one of paragraphs I to N, wherein the first signal comprises at least one of: an electrical signal, a hydraulic parameter, or a mechanical adjustment.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining can be stationary (e.g., permanent or fixed) or moveable (e.g., removable or releasable). Such joining can be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling can be mechanical, electrical, or fluidic.

References herein to the positions of elements (e.g., "top," "bottom," "above," "below") are merely used to describe the orientation of various elements in the FIGURES. It should be noted that the orientation of various elements can differ according to other exemplary embodiments, and that such variations are intended to be encompassed by the present disclosure.

In some embodiments, hardware and data processing components used to implement the various processes, operations, illustrative logics, logical blocks, modules and circuits described in connection with the embodiments disclosed herein, such as hardware and data processing components of controller (e.g., a memory within the controller 18, a memory within the OEM system 12, a memory in the first fuel control system 14, or a memory within the second fuel control system 16), can be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor can be a microprocessor, or any conventional processor, controller, microcontroller, or state machine. A processor also can be implemented as a combination of computing devices, such as a combination of a DSP and a microprocessor, a plurality of microprocessors, one or more microprocessors in conjunction with a DSP core, or any other such configuration. In some embodiments, particular processes and methods can be performed by circuitry that is specific to a given function. The memory (e.g., memory, memory unit, storage device) can include one or more devices (e.g., RAM, ROM, Flash memory, hard disk storage) for storing data and/or computer code for completing or facilitating the various processes, layers and modules described in the present disclosure. The memory can be or include volatile memory or non-volatile memory, and can include database components, object code components, script components, or any other type of information structure for supporting the various activities and information structures described in the present disclosure. According to an exemplary embodiment, the memory (e.g., a memory within the controller 18, a memory within the OEM system 12, a memory in the first fuel control system 14, or a memory within the second fuel control system 16) is communicably connected to the processor via a processing circuit and includes computer code for executing (e.g., by the processing circuit or the processor) the one or more processes described herein.

The present disclosure contemplates methods and systems on any machine-readable media for accomplishing various operations, e.g., such as operations 305-360 of the method 300, operations 405-470 of the method 400, operations 505-545 of the method 500, operations 605-655 of the method 600, operations 705-740 of the method 700, operations 805-845 of the method 800, operations 905-955 of the method 900, operations 1005-1055 of the method 1000, operations 1105-1165 of the method 1100, operations 1210-1270 of the method 1200, operations 1305-1375 of the method 1300, and operations 1410-1485 of the method 1400. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description can illustrate a specific order of method steps, the order of such steps can differ from what is depicted and described, unless specified differently above. Also, two or more steps can be performed concurrently or with partial concurrence, unless specified differently above.

It is important to note that any element disclosed in one embodiment can be incorporated or utilized with any other embodiment disclosed herein. Although only one example of an element from one embodiment that can be incorporated or utilized in another embodiment has been described above, it should be appreciated that other elements of the various embodiments can be incorporated or utilized with any of the other embodiments disclosed herein.

What is claimed is:

1. A method of controlling a dual fuel engine configured to receive a first fuel and a second fuel, the method comprising:
    operating the engine using the first fuel;
    measuring, by a controller, a current load of the engine;
    sending, by the controller, a first signal to a first fuel system to deliver an amount of the first fuel to the engine;
    determining, by the controller, at least one first operating parameter associated with the engine;
    determining, by the controller, an engine load estimate based on the first signal and the at least one first operating parameter;
    comparing, by the controller, the engine load estimate to the measured current load; based on the comparison, determining, by the controller, an adjusted engine load estimate to compensate for a drift in the first fuel system;
    determining, by the controller, an amount of a second fuel to deliver to the engine; and
    operating, by the controller, the engine using the adjusted engine load estimate for one of a predetermined number of cycles or a predetermined period of time;
        wherein the amount of the second fuel is determined based on at least one second operating parameter determined during the predetermined number of cycles or the predetermined period of time.

2. The method of claim 1, wherein determining the amount of the second fuel to deliver to the engine is based on comparing the engine load estimate to the measured current load.

3. The method of claim 1, further comprising determining, by the controller, a parasitic load on the engine.

4. The method of claim 3, wherein determining the parasitic load on the engine comprises determining, by the controller, a load corresponding to at least one cooling fan.

5. The method of claim 4, wherein determining the engine load estimate comprises determining, by the controller, a net engine load.

6. The method of claim 5, wherein determining the net engine load comprises:
estimating, by the controller, a gross engine load; and
subtracting the parasitic load.

7. A dual fuel engine system comprising:
an engine configured to receive a first fuel and a second fuel;
a first fuel system for delivering the first fuel to the engine;
a second fuel system for delivering the second fuel to the engine;
a controller operably coupled to each of the engine, the first fuel system, and the second fuel system, the controller configured to:
transmit a first signal to one of the first fuel system or the second fuel system to cause the first fuel system or the second fuel system to deliver an amount of the respective first fuel or the second fuel;
measure a current engine load;
determine at least one first operating parameter of the engine;
determine an engine load estimate based the at least one first operating parameter and the amount of the first fuel or the second fuel;
compare the engine load estimate to the current engine load;
based on the comparison, determine an adjusted engine load estimate to compensate for drift in one of the first fuel or the second fuel; and
operate the engine using the adjusted engine load estimate for one of a predetermined number of cycles or a predetermined period of time;
wherein the amount of the second fuel is determined based on at least one second operating parameter determined during the predetermined number of cycles or the predetermined period of time.

8. The dual fuel engine system of claim 7, wherein the controller is further configured to determine an amount of the other of the first fuel or the second fuel to deliver to the engine.

9. The dual fuel engine system of claim 8, wherein the controller is configured to determine the amount of the other of the first fuel or the second fuel based on at least one second operating parameter.

10. The dual fuel engine system of claim 7, wherein the current engine load is based on at least one of an engine torque or an engine speed.

11. The dual fuel engine system of claim 7, further comprising a generator driven by the engine, wherein the current engine load is based on a current and voltage corresponding to a generator.

12. The dual fuel engine system of claim 7, wherein the at least one first operating parameter comprises at least one of an engine speed, a coolant temperature, an oil temperature, a coolant pressure, an oil pressure, an intake manifold pressure, an intake manifold temperature, an exhaust manifold temperature, an exhaust manifold pressure, an injection timing, or an injection pressure.

13. The dual fuel engine system of claim 7, wherein the first signal comprises at least one of: an electrical signal, a hydraulic parameter, or a mechanical adjustment.

* * * * *